United States Patent
Yamamoto et al.

(10) Patent No.: US 7,923,148 B2
(45) Date of Patent: Apr. 12, 2011

(54) NONAQUEOUS ELECTROLYTE SECONDARY BATTERY INCLUDING A NEGATIVE ELECTRODE CONTAINING SILICON AND AN ADDITIVE WHICH RETARDS OXIDATION OF SILICON DURING BATTERY OPERATION

(75) Inventors: Hidekazu Yamamoto, Kobe (JP); Keiji Saisho, Kobe (JP); Yoshio Kato, Hirakata (JP); Shigeki Matsuta, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 1193 days.

(21) Appl. No.: 11/385,836

(22) Filed: Mar. 22, 2006

(65) Prior Publication Data

US 2006/0222944 A1    Oct. 5, 2006

(30) Foreign Application Priority Data

Mar. 31, 2005  (JP) ................. 2005-102733
Mar. 31, 2005  (JP) ................. 2005-102734
Mar. 31, 2005  (JP) ................. 2005-102735

(51) Int. Cl.
*H01M 4/60*    (2006.01)
*H01M 4/58*    (2006.01)
(52) U.S. Cl. ............... 429/214; 429/215; 429/218.1
(58) Field of Classification Search ........... 429/212, 429/215, 218.1, 214
See application file for complete search history.

(56) References Cited

U.S. PATENT DOCUMENTS

| | | | |
|---|---|---|---|
| 6,066,414 A | 5/2000 | Imoto et al. | 429/218.1 |
| 2002/0086206 A1* | 7/2002 | Fauteux et al. | 429/215 |
| 2002/0136950 A1* | 9/2002 | Gan et al. | 429/212 |
| 2005/0191547 A1 | 9/2005 | Konishiike et al. | 429/137 |

FOREIGN PATENT DOCUMENTS

| | | |
|---|---|---|
| CN | 1665050 A | 9/2005 |
| JP | 09-190820 A | 7/1997 |
| JP | 11-102705 A | 4/1999 |
| JP | 2003-86244 A | 3/2003 |
| JP | 2004-6188 A | 1/2004 |
| JP | 2004-296103 | 10/2004 |
| JP | 2004-335379 A | 11/2004 |
| JP | 2004-349079 A | 12/2004 |
| JP | 2005-63772 A | 3/2005 |
| KR | 2003-0066816 A | 8/2003 |

OTHER PUBLICATIONS

Chinese Office Action dated May 27, 2010, issued in Chinese Patent Appln, No. 200610067109.2, and an English translation thereof.

* cited by examiner

*Primary Examiner* — Dah-Wei D Yuan
*Assistant Examiner* — Zachary Best
(74) *Attorney, Agent, or Firm* — Kubovcik & Kubovcik

(57) ABSTRACT

Disclosed is a nonaqueous electrolyte secondary battery which has a negative electrode containing silicon as a negative active material, a positive electrode containing a positive active material, a nonaqueous electrolyte and a separator. Characteristically, an additive which retards oxidation of silicon during operation of the battery is contained either in an interior or surface portion of the positive electrode, or in an interior or surface portion of the negative electrode, or in an interior or surface portion of the separator.

12 Claims, 21 Drawing Sheets

NONAQUEOUS ELECTROLYTE SECONDARY BATTERY INCLUDING A NEGATIVE ELECTRODE CONTAINING SILICON AND AN ADDITIVE WHICH RETARDS OXIDATION OF SILICON DURING BATTERY OPERATION

BACKGROUND OF THE INVENTION

1. Field of the Invention

The present invention relates to a nonaqueous electrolyte secondary battery.

2. Description of the Related Art

The recent years have seen a marked reduction in size and weight of portable electric devices. Also, the increase of their functions pushes up their power consumption. This has led to a strong demand for further improvements of secondary lithium batteries which serve as a power source of those devices, in terms of weight reduction and capacity increase.

As a measure to meet such a demand, the use of silicon as an electrode material has been recently proposed which shows superior charge/discharge capacity, both per unit mass and unit volume, compared to a carbon electrode.

In conventional secondary lithium batteries using a silicon thin film as a negative active material, an electrode has been proposed including a thin film of active material which is divided into columns by gaps formed therein and extending in its thickness direction. The provision of such a columnar structure lessens a stress engendered due to expansion and shrinkage of the active material, prevents separation of the active material from a current collector and thereby improves charge-discharge cycle characteristics.

It is however known that, in the negative electrode using such a silicon thin film, the active material changes in properties and increases in porosity with repeated charge-discharge cycling. As will be described later, the inventors of this application have discovered that such a change in properties of the active material results from oxidation of silicon during operation of a battery. The present invention is based on such a knowledge of the inventors.

Japanese Patent Laying-Open No. 2004-349079 proposes the use of a pH control agent in order to retard oxidation of silicon in the manufacture of an electrode. However, in Japanese Patent Laying-Open No. 2004-349079, neither disclosure nor suggestion is provided as to oxidation of silicon during charge-discharge cycles.

Japanese Patent Laying-Open No. 2004-6188 describes that incorporation of a saturated dicarboxylic acid in an interior portion of a negative electrode improves charge-discharge cycle characteristics. Japanese Patent Laying-Open No. 2004-335379 describes that incorporation of an organic acid in an interior portion of a negative electrode improves cycle characteristics. However, neither of these prior art references provides disclosure as to improvement of charge-discharge cycle characteristics by retarding oxidation of silicon.

SUMMARY OF THE INVENTION

It is an object of the present invention to provide a nonaqueous electrolyte secondary battery including silicon as a negative active material, which shows suppressed expansion of the negative active material containing silicon and improved charge-discharge cycle characteristics.

The present invention provides a nonaqueous electrolyte secondary battery which has a negative electrode containing silicon as a negative active material, a positive electrode containing a positive active material, a nonaqueous electrolyte and a separator.

Characteristically, an additive which can retard oxidation of silicon during operation of the battery is contained either in an interior or surface portion of the positive electrode, or in an interior or surface portion of the negative electrode, or in an interior or surface portion of the separator.

In the present invention, due to the inclusion of the additive capable of retarding oxidation of silicon during operation of the battery either in an interior or surface portion of the positive electrode, or in an interior or surface portion of the negative electrode or in an interior or surface portion of the separator, expansion of the negative active material containing silicon as a result of deterioration thereof is suppressed so that charge-discharge cycle characteristics can be improved.

In the present invention, examples of additives which retard oxidation of silicon during operation of the battery include acids, weak alkalis, acid anhydrides and lithium salts of acids. As will be described later, the inventors of this application have found that oxidation of silicon during battery operation is promoted by a reaction similar to a reaction involving $OH^-$. Such oxidation of silicon by an alkali can be retarded if an atmosphere surrounding silicon is rendered weak-alkaline or acidic. Accordingly, the additive for use in the present invention is a material by which an atmosphere surrounding silicon can be rendered weak-alkaline or acidic.

Specific examples of additives for use in the present invention include acid anhydrides such as succinic anhydride and acetic anhydride; carboxylic and dicarboxylic acids such as oxalic acid, malonic acid, succinic acid, glutaric acid, adipic acid, pimelic acid, suberic acid, azelaic acid, sebacic acid, phthalic acid and fumaric acid, and their salts and esters; hydroxy acids; carbonates such as lithium carbonate; nitrates such as lithium nitrate; sulfonates such as lithium sulfonate; acrylic acid and its derivatives; methacrylic acid and its derivatives; compounds which generate free fluorine in an electrolyte; salts formed via a reaction between a strong acid and a weak alkali; and the like.

In a first aspect of the present invention, the additive is contained in an interior or surface portion of a positive electrode. It is known that a reaction product in a battery shows a general trend of adhering onto a surface of a negative electrode. Inclusion of the additive in an interior or surface portion of the positive electrode, in accordance with the first aspect of the present invention, suppresses such adherence of the reaction product and retards oxidation of silicon more effectively.

In the first aspect of the present invention, the additive is preferably contained in the amount of 0.01-10% by weight, based on the weight of the positive active material. If its content exceeds 10% by weight, the additive in some cases decomposes on a positive electrode side in an initial stage of battery fabrication to result in the formation of a deposit on a surface of the positive electrode. This reduces an initial capacity of the battery and, as a result, reduces an energy density. On the other hand, if its content falls below 0.01% by weight, the effect of the present invention that improves charge-discharge cycle characteristics may not be obtained sufficiently.

The inclusion of the additive in an interior or surface portion of the positive electrode, in accordance with the first aspect of the present invention, assures a steady supply of the additive to the electrolyte near the surface of silicon as a negative active material. This causes continuous consumption of a component which may oxidize silicon and accordingly retards oxidation of silicon without interruption.

In a second aspect of the present invention, the additive is contained in an interior or surface portion of the negative electrode. In the second aspect of the present invention, the additive is preferably contained in the amount of 0.01-10% by weight, based on the weight of the negative active material. If its content exceeds 10% by weight, the additive in some cases decomposes on a negative electrode side in an initial stage of battery fabrication to result in the formation of a deposit on a surface of the negative electrode. This reduces an initial capacity of the battery and, as a result, reduces an energy density. On the other hand, if its content falls below 0.01% by weight, the effect of the present invention that improves charge-discharge cycle characteristics may not be obtained sufficiently.

In the second aspect of the present invention, the following method can be utilized to incorporate the additive in an interior portion of a negative electrode. For example, in the case where the additive is used in the powder form, it is first mixed with a binder and active material to form an anode mix. Then, a solvent is added to the mix to form a slurry which is subsequently coated and dried. As a result, a plate having the additive contained in an interior portion of the negative electrode can be obtained.

Also in the second aspect of the present invention, the following method can be utilized to incorporate the additive in a surface portion of a negative electrode. A solid-form additive is subdivided into powder particles. A suspension of these powder particles is sprayed on a surface of an electrode. A vacuum treatment is subsequently carried out to remove a solvent, resulting in uniform dispersion of the additive on the surface. As a result, the additive is incorporated uniformly in a surface portion of the negative electrode.

In the other case where the additive is used in the liquid form, the additive may be sprayed onto a surface of an electrode. This enables uniform incorporation of the additive in a surface portion of the negative electrode.

The inclusion of the additive in an interior or surface portion of the negative electrode, in accordance with the second aspect of the present invention, assures a steady supply of the additive to the electrolyte near the surface of silicon as a negative active material. This causes continuous consumption of a component which may oxidize silicon and accordingly retards oxidation of silicon without interruption.

In a third aspect of the present invention, the additive is contained in the separator. Accordingly, the additive can be incorporated in the battery without causing any problem, even when the negative or positive electrode contains a compound which easily reacts with the additive.

In the third aspect of the present invention, the additive is contained in the separator in the amount of $1 \times 10^{-6}$-$1 \times 10^{-3}$ g per cm$^2$ of the separator. If the amount of the additive exceeds $1 \times 10^{-3}$ g per cm$^2$ of the separator, an initial capacity of the battery may decrease to result in the reduced energy density. This is probably because the increase in amount of the additive disturbs diffusion of lithium ions through the separator. On the other hand, if the amount of the additive falls below $1 \times 10^{-6}$ g per cm$^2$ of the separator, the effect of the present invention that improves charge-discharge cycle characteristics may not be obtained sufficiently.

The type of the separator is not particularly specified so long as it is useful for lithium secondary batteries. It may preferably comprise a microporous film of polyolefin such as polyethylene or polypropylene, a composite film thereof, a microporous film of polyamide, or a nonwoven fabric made of fine fibers such as a glass fiber, for example.

Also in the third aspect of the present invention, the following method can be utilized to incorporate the additive in a separator. A solid-form additive is subdivided into powder particles. A suspension of these powder particles is sprayed onto a surface of the separator. A vacuum treatment is then carried out to remove a solvent, resulting in uniform dispersion of the additive on the separator surface. As a result, the additive is incorporated uniformly in a surface portion of the separator.

Alternatively, a solution containing the additive dissolved therein may be impregnated into a separator and then a solvent is removed by vacuum drying. This enables the separator to hold the additive in its interior portion.

Inclusion of the additive in an interior or surface portion of the separator, in accordance with the third aspect of the present invention, assures a steady supply of the additive to the electrolyte near a surface of silicon as a negative active material. This causes continuous consumption of a component which may oxidize silicon and accordingly retards oxidation of silicon without interruption.

The matters common to the first through third aspects of the present invention may be described below as those of the "present invention".

The negative electrode in the present invention is preferably formed by depositing a thin film of silicon or silicon alloy onto a current collector. Such a thin film can be deposited by various processes including sputtering, CVD, vapor deposition and thermal spraying. Presumably, expansion of this thin film in a thickness direction during a charge reaction causes a protective film to partly come away from the active material, eases contact of the electrolyte with the exposed fresh surface of the active material and, as a result, causes oxidation of silicon. If oxidation of silicon under such circumstances is retarded swelling of the active material during charge-discharge cycles can be suppressed to thereby restrain an increase in thickness of a layer of the active material.

Preferably, the aforesaid thin film of silicon or silicon alloy has such a columnar structure that it is divided into columns by gaps formed therein and extending in its thickness direction. The provision of such a columnar structure lessens a stress engendered when the active material expands and shrinks as lithium is inserted and deinserted from the active material, and effectively prevents delamination or falling-off of the active material layer from the current collector. By retarding oxidation of silicon present in the active material that repeats such expansion and shrinkage, swelling of silicon and cycle deterioration can be suppressed.

In order to form the gaps that extend in the thickness direction of the thin film, irregularities are preferably formed on a surface of the thin film. In order to form such irregularities on the surface of the thin film of active material, a surface-roughened copper foil or the like is preferably used as a negative current collector. A typical example of such a copper foil is an electrolytic copper foil. The electrolytic copper foil may be obtained according to the following procedure, for example: A metallic drum is immersed in an electrolyte solution containing copper ions dissolved therein. The introduction of current while the drum is rotated results in the deposition of copper on a surface of the drum. The electrolytic copper foil is then obtained by removing the deposited copper from the drum. A metal may be deposited on both or either surface of the electrolytic copper foil by an electrolytic process to impart surface roughness thereto. Alternatively, a metal may be deposited on a surface of a rolled foil by an electrolytic process to impart surface roughness thereto.

In the present invention, the negative active material may comprise an alloy of silicon and another metal. Examples of such metals include cobalt, zirconium, zinc and iron. An alloy of silicon and cobalt is particularly useful. By the addition of cobalt, charge-discharge cycle characteristics can be further improved. Preferably, the alloy of silicon and another metal contains at least 50 atomic % of silicon.

In the present invention, the additive preferably remains in a solid state in a nonaqueous electrolyte solution. That is, the additive in the present invention preferably comprises a material that hardly dissolves into a nonaqueous electrolyte solution. Because the additive is consumed via a reaction with a component in the electrolyte solution that acts to increase the amount of silicon oxide, it is preferred that the additive constantly exists in the electrolyte solution. If the additive is soluble in the electrolyte solution, an excess amount of the additive readily dissolves into the electrolyte solution. In such a case, the additive may be consumed by a reaction with lithium or others present in silicon and possibly exhaust in a later charge-discharge cycle.

The additive, if present in a solid state in the nonaqueous electrolyte solution, dissolves gradually into the electrolyte solution. Only a part of the additive that dissolved therein takes part in the reaction. Accordingly, the amount of the additive that is consumed by the side reaction is minimized. It is thus believed that the additive can be used effectively and exhibit the effect that depends on the amount of the additive.

In the first and second aspects of the present invention, the additive preferably has a mean particle size within a particle size distribution of the positive or negative active material. This enables uniform dispersion of the additive in an interior portion of the positive or negative electrode.

In the present invention, the nonaqueous electrolyte solution preferably contains a film former. This film former, when subjected to reductive decomposition, forms a film which is believed to improve homogeneity of a deinsertion-insertion reaction of lithium on a surface of the negative electrode, suppress development of local deterioration and reduce the occurrence of the side reaction, effectively. However, this type of film is insufficient to retard oxidation of a silicon surface. Also, the effectiveness of the film is lost when the film former in the battery exhausts. As silicon is oxidized, swelling of the negative active material advances and its surface area enlarges. Then, an increasing proportion of the film is destroyed to increase the consumption of the film former. This reduces the number of charge-discharge cycles during which the effect of adding the film former is obtained. Accordingly, if the effect of adding the film former is to continue, swelling of the negative active material must be suppressed. Therefore, the simultaneous use of the additive and the film former, in accordance with the present invention, permits them to exhibit their individual advantages efficiently by a synergistic effect. This results in obtaining improved cycle characteristics.

Specific examples of film formers include vinylene carbonate (VC) and vinylethylene carbonate (VEC). Under high temperature circumstances, ethylene carbonate (EC) also serves as the film former.

The film former is preferably added in the amount of 0.01-10% by weight, more preferably 0.1-10% by weight, based on the weight of the nonaqueous electrolyte solution.

In the present invention, the additive may be held in a support material. Any material, either inorganic or organic, which has internal open spaces and is stable in the battery can be suitably used as the support material. Examples of specific support materials include solid inorganic fillers such as alumina, titania and silica.

Also, the additive may be encapsulated by an outer shell which gradually dissolves into the electrolyte solution. Particularly when the liquid-form additive is used, the same result is obtained by using a high-molecular polymer which can retain the additive by swelling. The additive, if retained by the support material, dissolves into the electrolyte solution in a more controlled fashion. The additive, if solid, may be held within internal open spaces of the support material and, if liquid, may be impregnated into the support material.

Also in the third aspect of the present invention, the support material preferably comprises solid fine particles. The use of such a support material enhances strength of the separator which can then be formed into a thinner film, and thus permits the separator to retain the additive therein without reduction of an energy density.

Also in the first and second aspects of the present invention, the support material is preferable electronically conductive. The use of such a support material eliminates the need of using a conductive aid and thus permits the additive to be held in the positive or negative electrode without reduction of an energy density.

Examples of nonaqueous solvents for use in the nonaqueous electrolyte solution in the present invention include cyclic carbonates, chain carbonates, lactone compounds (cyclic carboxylates), chain carboxylates, cyclic ethers, chain ethers and sulfur-containing organic solvents. Preferred among them are cyclic carbonates with a carbon number of 3-9, chain carbonates, lacton compounds (cyclic carboxylates), chain carboxylates, cyclic ethers and chain ethers. Particularly preferred nonaqueous solvents contain one or both of a cyclic carbonate having a carbon number of 3-9 and a chain carbonate.

Examples of useful solutes for the nonaqueous electrolyte solution in the present invention include lithium salt compounds generally used in lithium secondary batteries.

The positive active material for use in the present invention may be suitably chosen from those useful for lithium secondary batteries. Examples of positive active materials include lithium cobaltate, lithium manganate, lithium nickelate and lithium transition metal complex oxides containing oxides thereof. These oxides may be used alone or in combination.

(Concerning Oxidation of Silicon During Battery Operation)

Descriptions are below given as to oxidation of silicon during battery operation.

FIG. 1 is a secondary electron image, showing a rupture surface of an electrode of the silicon thin film before charge and discharge. This electrode of the silicon thin film is an electrode formed by sputter depositing a thin film of silicon onto an electrolytic copper foil as a current collector.

FIG. 2 is a secondary electron image, showing the electrode in its state after the first-cycle charge. FIG. 3 is a secondary electron image, showing the electrode in its state after the first-cycle discharge.

As can be clearly seen from FIGS. 2 and 3, the silicon thin film, when brought to a charged state by insertion of lithium thereinto, expands to at least twice its initial thickness. By the following discharge, cracks are formed in a thickness direction of the silicon thin film. As a result, the silicon thin film assumes a columnar structure and expands to at least 1.5 times its initial thickness before charge and discharge. Such a columnar structure of the silicon thin film is effective to lessen a stress engendered due to expansion and shrinkage of the active material and thus prevents shedding of the active material from the current collector.

With the use of such a negative electrode of the silicon thin film, a discharge capacity retention rate declines with repeated charge-discharge cycling, as shown in FIG. 4.

FIGS. 5-7 are microscopic images when taken with a scanning ion microscope, showing sections of an electrode of the silicon thin film in its state before charge and discharge, before deterioration of discharge capacity (after 10 cycles)

and after deterioration of discharge capacity (after 100 cycles), respectively. Specifically, a tungsten protective film is deposited on a surface of an active material layer, followed by cutting with a focused ion-beam device. The exposed columns of the active material are then observed with a scanning ion microscope to obtain each microscopic image. In FIGS. 5-7, an arrow at an end of a single-dotted chain line indicates a tungsten protective film.

In FIGS. 5-7, an arrow at an end of a solid line indicates a modified portion which appears bright relative to an interior of the columnar active material. This portion is a region where the active material underwent a property change. An arrow at an end of a dotted line indicates an unmodified portion which appears dark. This portion is an interior region of the column where the active material remains unchanged in property.

As can be clearly seen from FIGS. 5-7, the modified portion of the active material is small both before charge and discharge and before deterioration of discharge capacity but becomes larger after deterioration of discharge capacity. In a region of the modified portion, the active material decreases in bulk density (swells) as a result of formation of open spaces therein and accordingly the layer of active material increases in thickness. However, the active material is observed to remain unpowdered. No appreciable shedding thereof from the current collector is observed.

The negative electrode was cleaned with dimethyl carbonate, dried under vacuum and then subjected to X-ray photoelectron spectroscopy (XPS) combining sputtering by an argon ion beam, in which the negative active material was analyzed along its depth for oxygen and silicon present in its interior and surface portions.

In FIGS. 8-10, the silicon and oxygen concentrations, in terms of atomic percent, are shown versus sputtering time. FIG. 8-10 show the data for the active material before charge and discharge, before deterioration of discharge capacity and after deterioration of discharge capacity, respectively. A rate of sputtering is 10 nm/min, in terms of $SiO_2$.

As can be clearly seen from FIGS. 8-10, before charge and discharge and before deterioration of discharge capacity, oxygen is only concentrated at the utmost surface. However, after deterioration of discharge capacity, oxygen exists in the concentration of at least 20 atomic % to the depth of sputtering time of 80 minutes (800 nm depth from the utmost surface). This demonstrates that oxidation of silicon advances with charge-discharge cycling.

Accordingly, the modified portion shown by an arrow at an end of a solid line in FIGS. 5-7 is believed to constitute a region where a high concentration of oxygen exists in the form of silicon oxide. On the other hand, in the unmodified portion shown by an arrow at an end of a dotted line, silicon is believed to remain in the unoxidized state.

In the X-ray photoelectron spectroscopy (XPS) analysis, a valence of silicon is known to be related to the binding energy position of an XSP Si(2 p) spectrum by 0-valent silicon: about 99 eV, 2-valent silicon: about 101 eV and 4-valent silicon: about 103 eV.

FIG. 11 shows XPS Si-2 p spectra for the silicon thin film of the negative electrode at the utmost surface and after sputtered for 1 minute, 10 minutes, 20 minutes, 40 minutes and 80 minutes. As can be clearly seen from FIG. 11, 2-valent silicon is concentrated in the surface portion and 0-valent silicon is concentrated in the interior portion of the silicon thin film.

FIGS. 12-14 shows XPS profiles for the silicon thin film of the negative electrode before charge and discharge (FIG. 12), before deterioration of discharge capacity (FIG. 13) and after deterioration of discharge capacity (FIG. 14), wherein a peak area of the XPS Si(2 p) spectrum is divided by 0-valent silicon and oxidized silicon (2-valent silicon plus 4-valent silicon) and their concentrations, in terms of atomic percent, are plotted.

As can be clearly seen from FIGS. 12-14, before charge and discharge and before deterioration of discharge capacity, silicon oxide only exists at the utmost surface. However, after deterioration of discharge capacity, silicon oxide exists in the concentration of at least 20 atomic % to the depth of sputtering time of 80 minutes.

As discussed above, it has been confirmed that, as silicon is oxidized with charge-discharge cycling, the active material swells increasingly to increase its thickness. The following is believed to describe one reason for the deterioration of discharge capacity. As the active material is oxidized at its surface and swells, its electric conduction decreases at the surface and its resistance increases when lithium is stored and released. Silicon may be oxidized by the following reactions:

$$Si+2Li^++2OH^-\rightarrow Si(OLi)_2+H_2\uparrow \quad (1)$$

$$2Si+6OH^-\rightarrow 3SiO_2^{2-}+3H_2\uparrow \quad (2)$$

These reaction formulas are generally known in the aqueous solution system. In the aqueous solution system, silicon is oxidized by a reaction with $OH^-$.

However, little $OH^-$ is transferred in an organic solution for use as a nonaqueous electrolyte solution. In this case, an alkaline lithium-containing compound, such as LiOH, ROLi, $Li_2O$, $ROCO_2Li$ or $RCO_2Li$, is believed to cause silicon to undergo reactions similar to those involving $OH^-$ in the above formulas (1) and (2) to increase silicon oxide.

Under the presence of lithium, water present in the system may also react with lithium via the following reaction to produce $OH^-$ that causes oxidation of silicon:

$$2Li+2H_2O\rightarrow 2Li-OH+H_2\uparrow \quad (3)$$

A component which increases production of silicon oxide in the battery is considered to be a substance that causes the following reactions (i) and (ii):

(i) a reaction by which silicon changes its oxidation number from 0 to 2 or 4, i.e., an oxidation reaction of silicon; and (ii) a reaction by which a compound having a silicon-oxygen bond is produced.

The foregoing demonstrate that deterioration of silicon as an active material occurs as a result of an oxidation reaction of silicon. In this invention, the additive which retards oxidation of silicon is incorporated in an interior or surface portion of the separator, based on such finding of the inventors of this application, to thereby suppress deterioration of silicon and, as a result, improve charge-discharge cycle characteristics.

Inclusion of the additive capable of retarding oxidation of silicon during battery operation either in an interior or surface portion of the positive electrode, or in an interior or surface portion of the negative electrode or in an interior or surface portion of the separator, in accordance with the present invention, suppresses deterioration and thus expansion (swelling) of the active material containing silicon, resulting in obtaining improved charge-discharge cycle characteristics.

DESCRIPTION OF THE PREFERRED EXAMPLES

Figure 1:
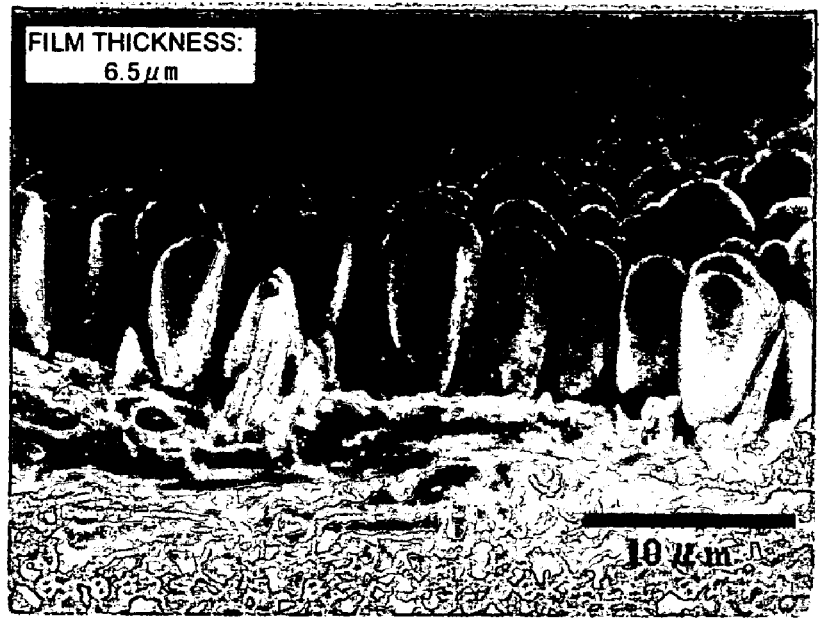
FIG. 1 is a secondary electron image, showing a rupture surface of an electrode of a silicon thin film before charge and discharge.
Figure 2:
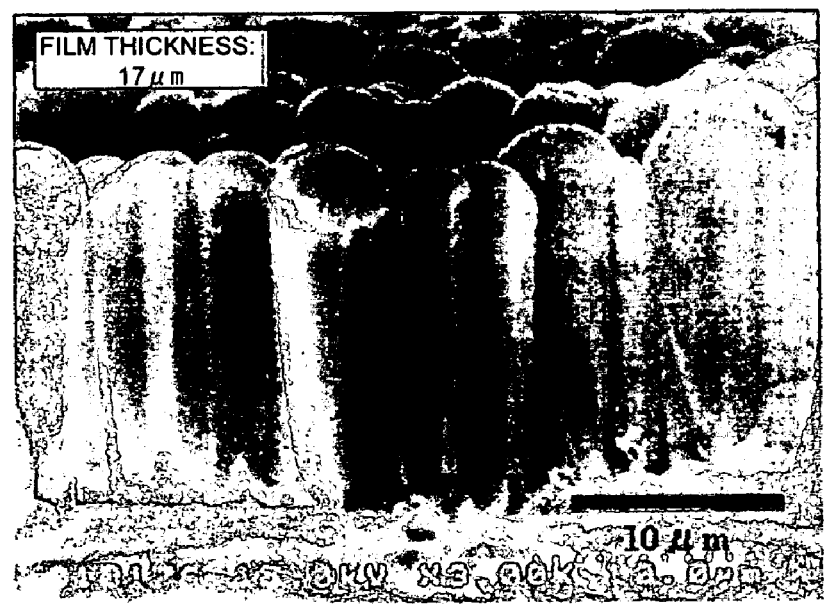
FIG. 2 is a secondary electron image, showing a rupture surface of an electrode of a silicon thin film in a conventional battery in its state after the first-cycle charge.
Figure 3:
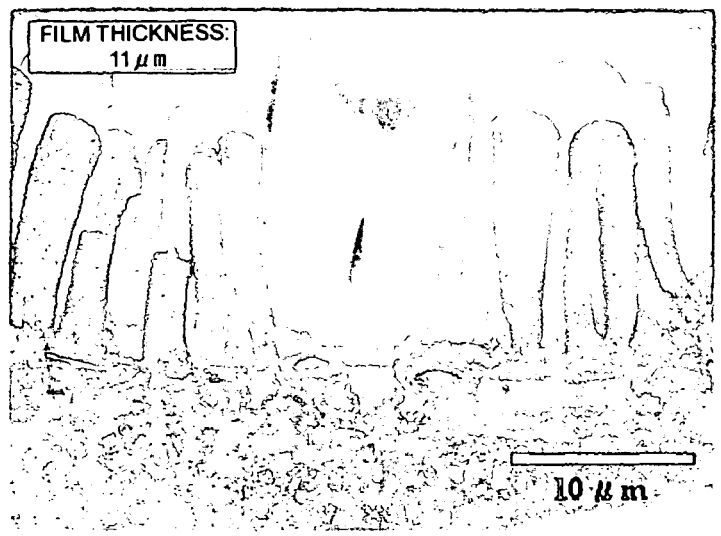
FIG. 3 is a secondary electron image, showing a rupture surface of an electrode of a silicon thin film in a conventional battery in its state after the first-cycle discharge.
Figure 4:
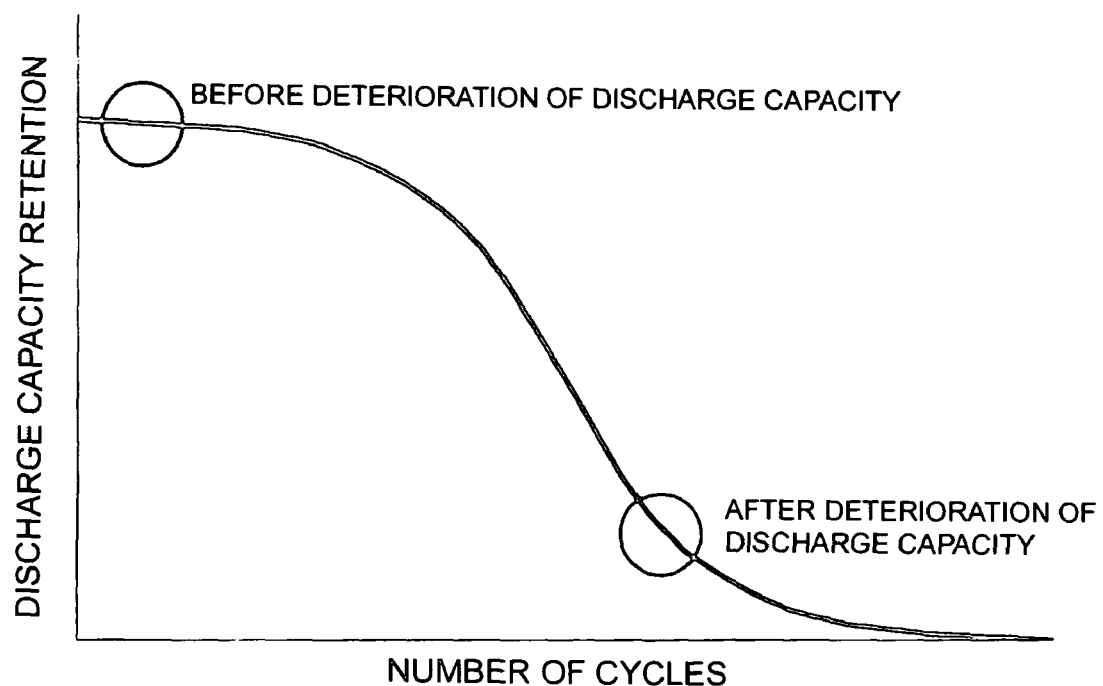
FIG. 4 is a graph, showing charge-discharge cycle characteristics for a conventional battery.
Figure 5:
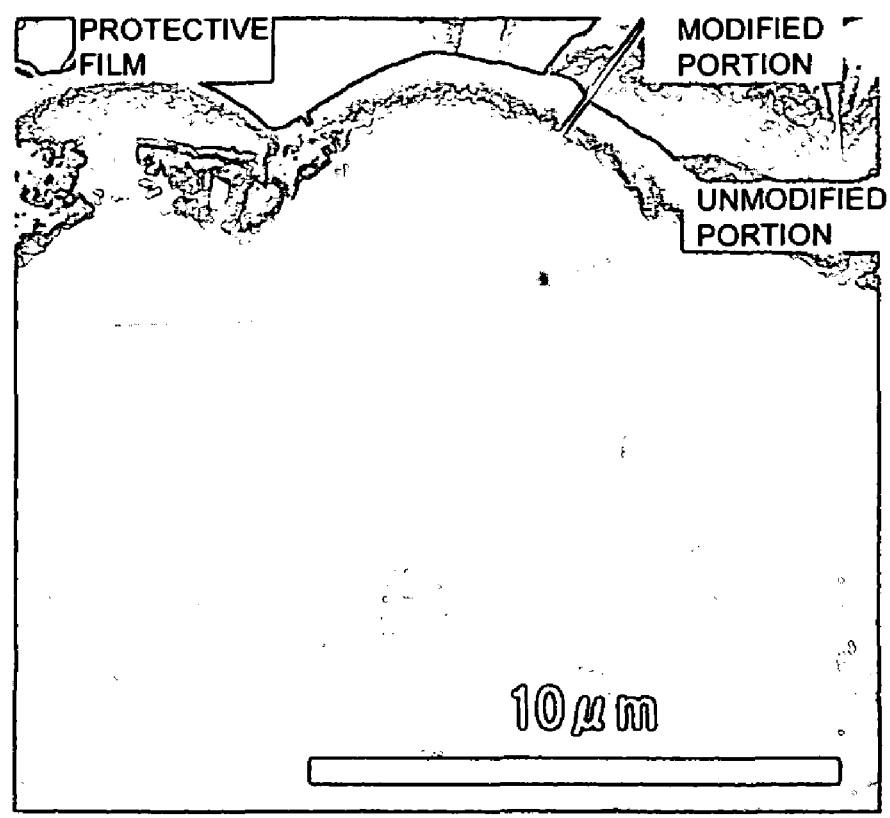
FIG. 5 is an image when taken with a scanning ion microscope, showing a section of an electrode of a silicon thin film in its state before charge.
Figure 6:
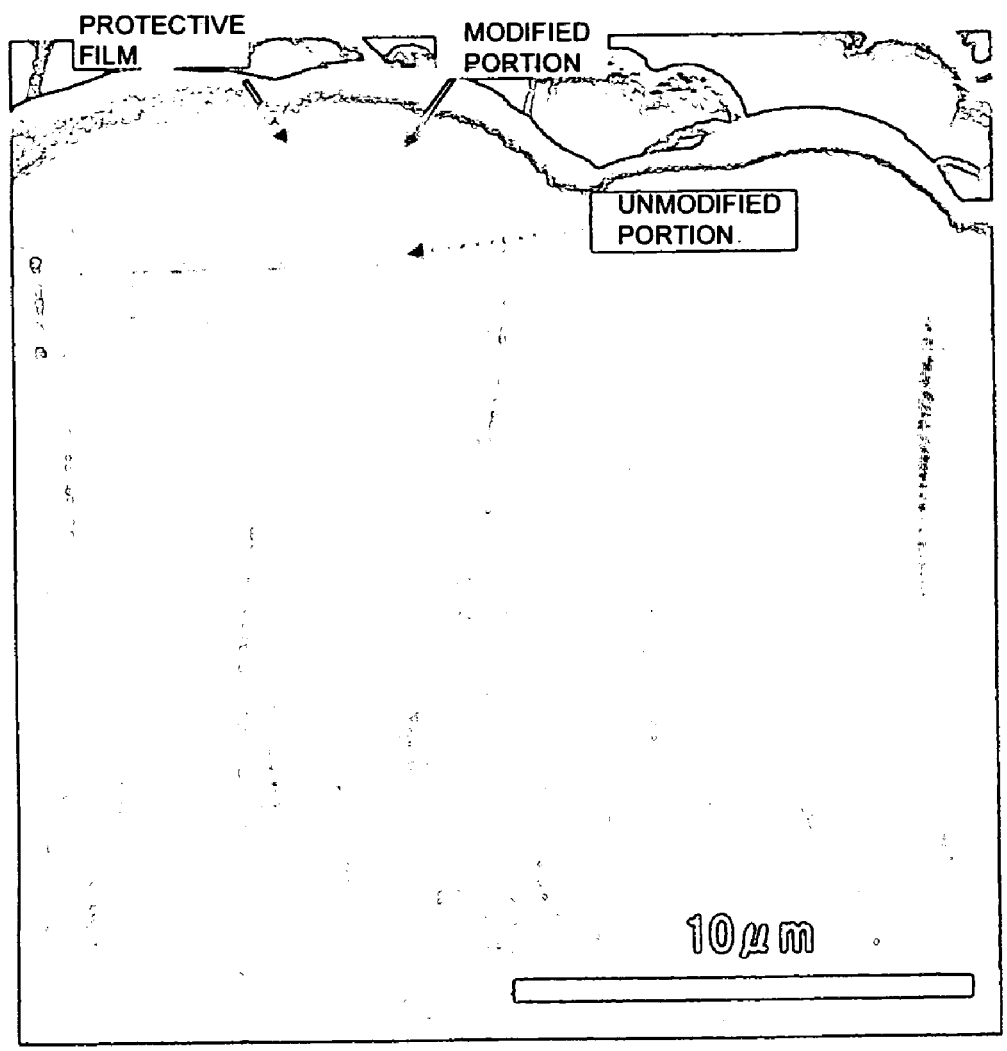
FIG. 6 is an image when taken with a scanning ion microscope, showing a section of an electrode of a silicon thin film in a conventional battery in its state before discharge capacity deterioration.
Figure 7:
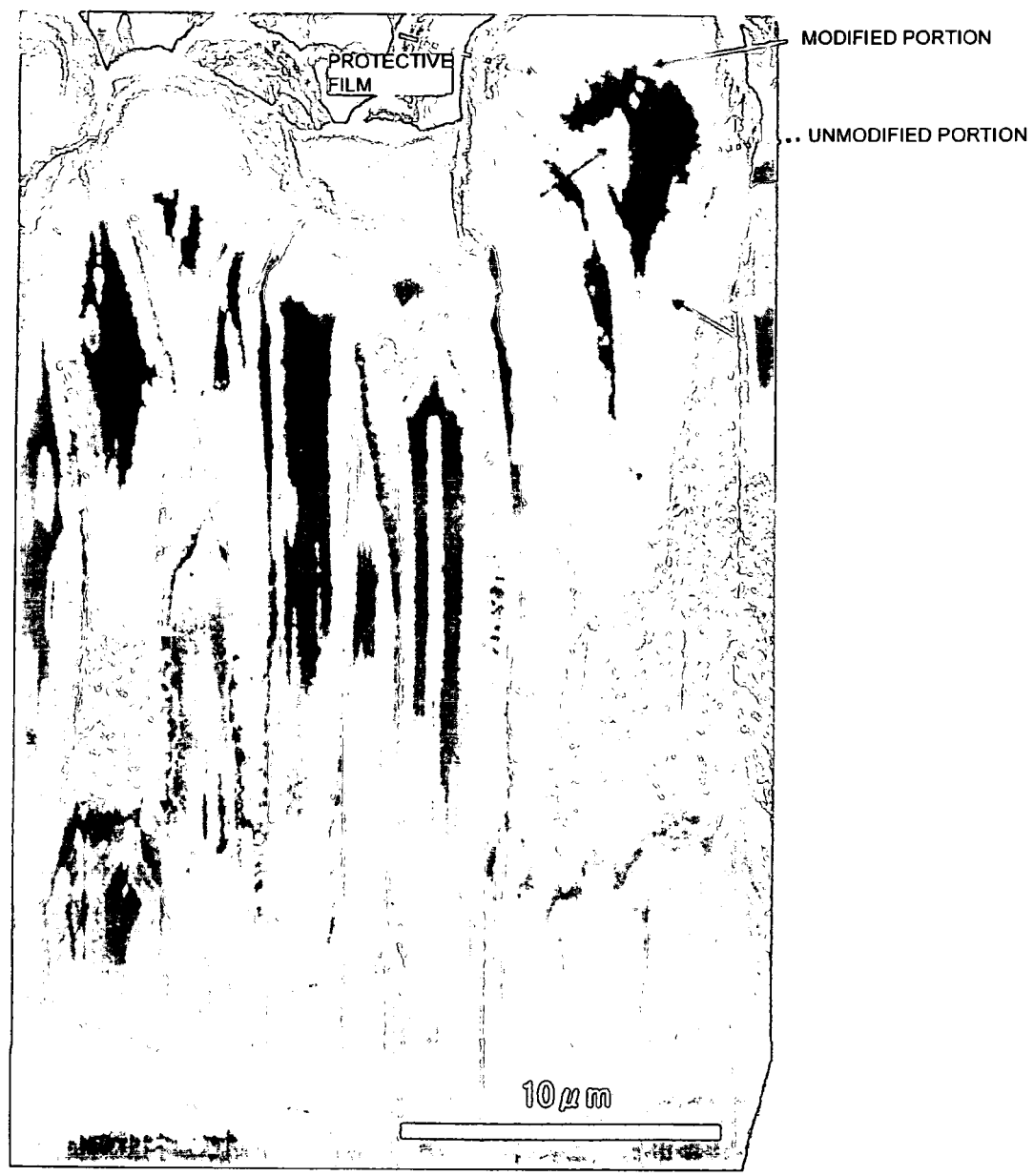
FIG. 7 is an image when taken with a scanning ion microscope, showing a section of an electrode of a silicon thin film in a conventional battery in its state after discharge capacity deterioration.
Figure 8:
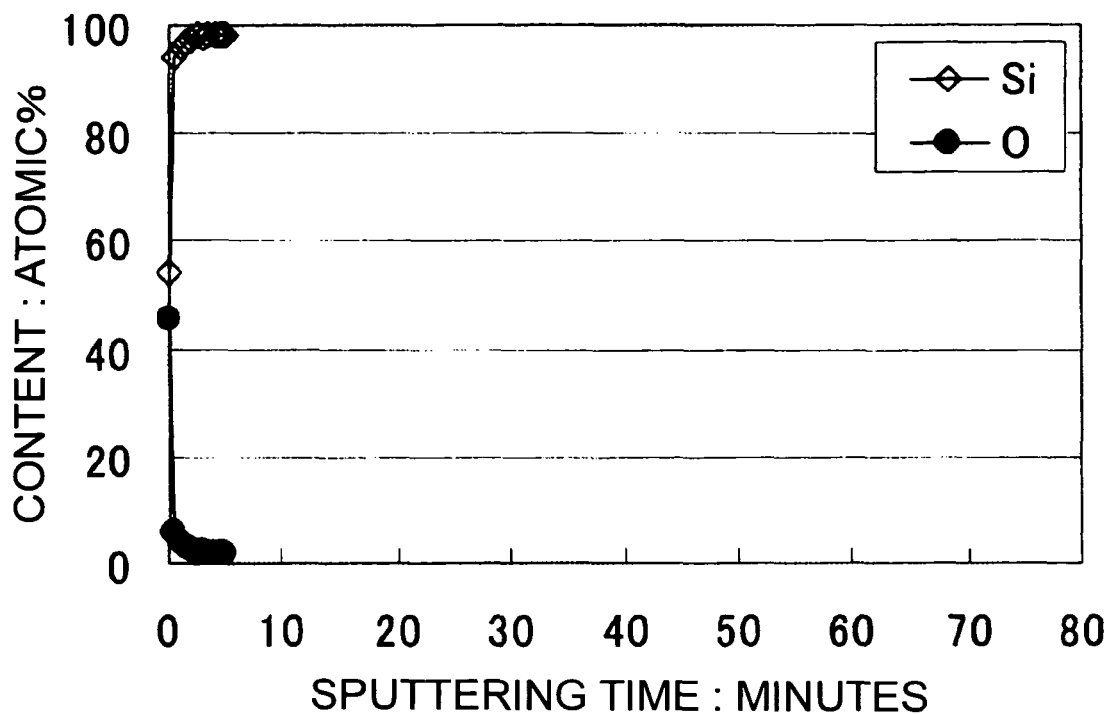
FIG. 8 is an XPS profile, showing silicon and oxygen concentrations in a surface portion of a silicon thin film before charge and discharge.
Figure 9:
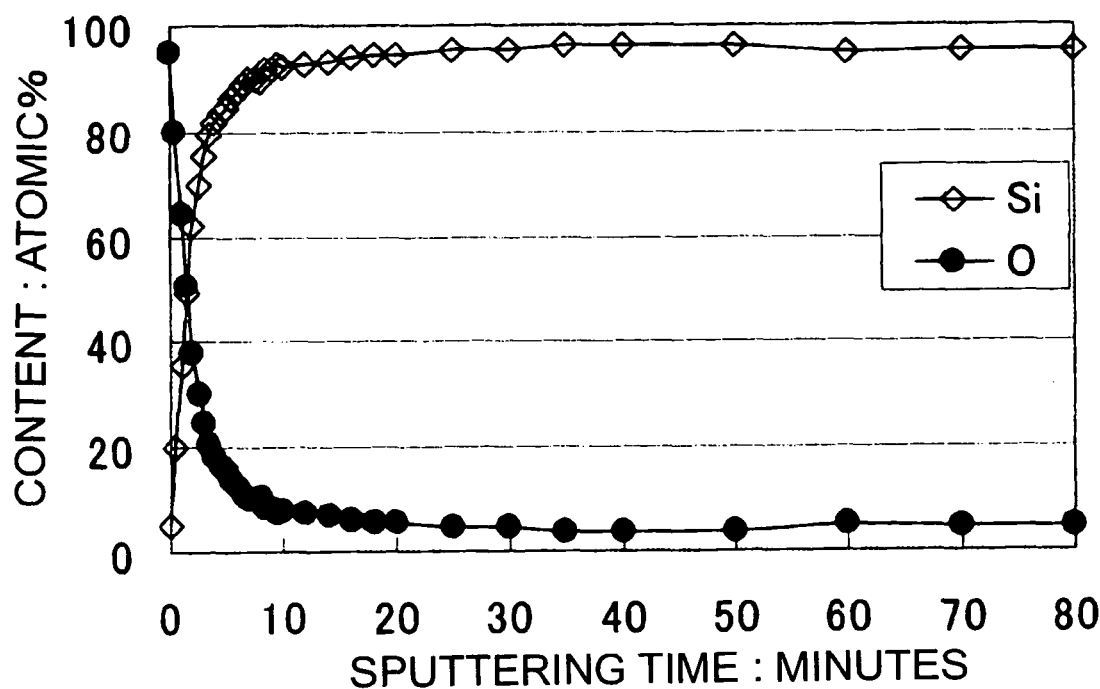
FIG. 9 is an XPS profile, showing silicon and oxygen concentrations in a surface portion of a negative electrode of a silicon thin film in a conventional battery before discharge capacity deterioration.
Figure 10:
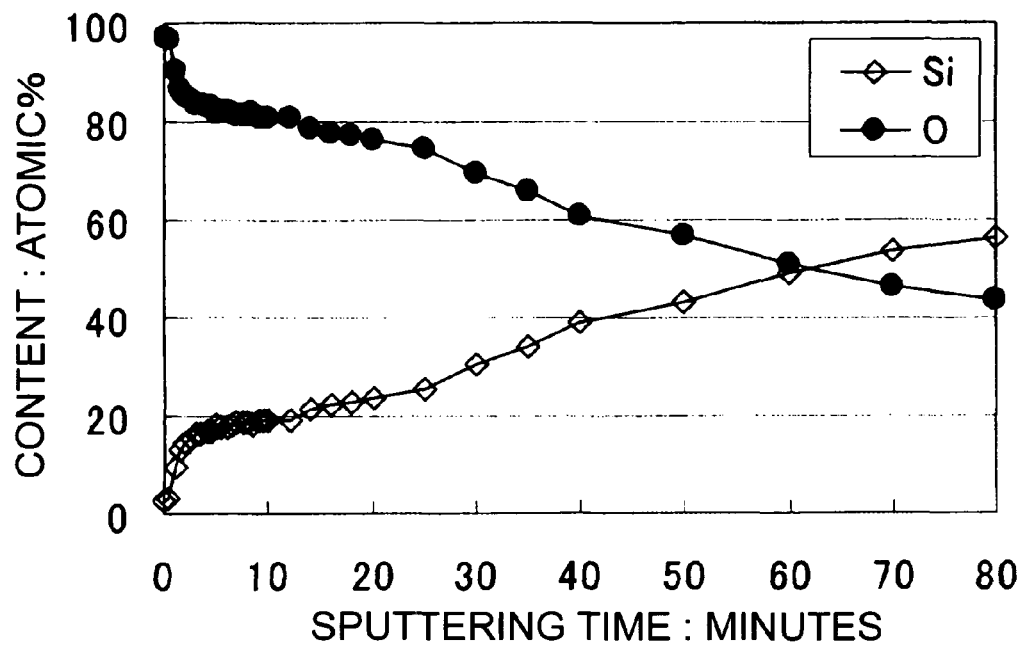
FIG. 10 is an XPS profile, showing silicon and oxygen concentrations in a surface portion of a negative electrode of a silicon thin film in a conventional battery after discharge capacity deterioration.
Figure 11:
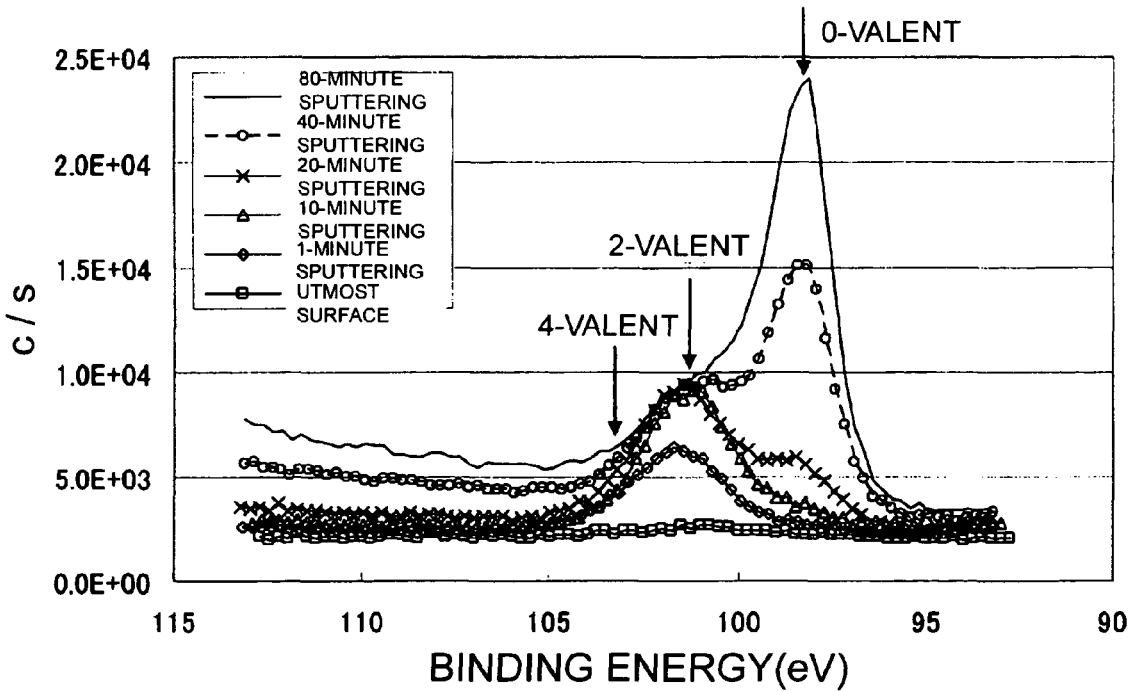
FIG. 11 is an XPS Si(2 p) spectrum profile for a surface portion of a negative electrode of a silicon thin film in a conventional battery after discharge capacity deterioration.
Figure 12:
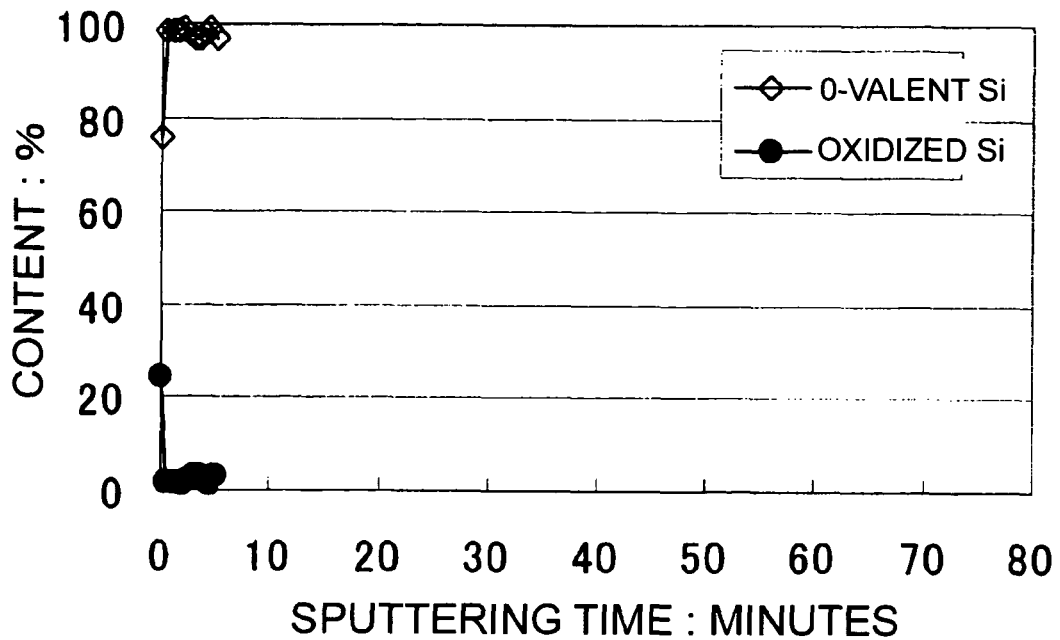
FIG. 12 is an XPS profile, showing concentrations of 0-valent silicon and silicon oxide present in a surface portion of a negative electrode of a silicon thin film before charge and discharge.
Figure 13:
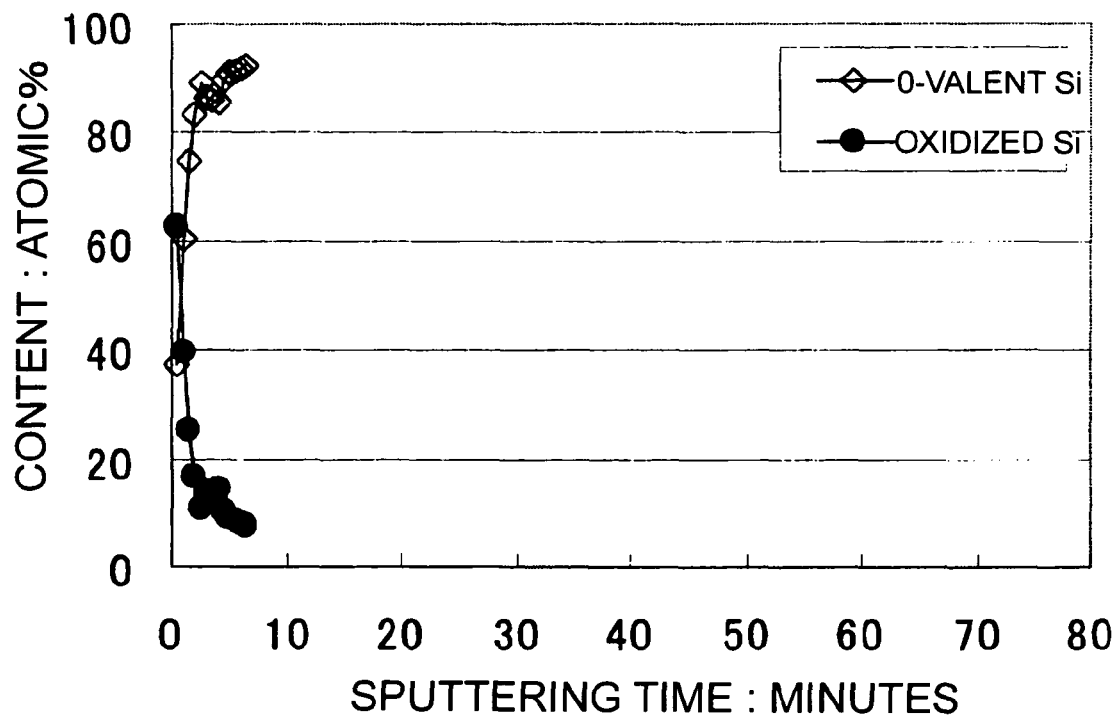
FIG. 13 is an XPS profile, showing concentrations of 0-valent silicon and silicon oxide present in a surface portion of a negative electrode of a silicon thin film in a conventional battery before discharge capacity deterioration.
Figure 14:
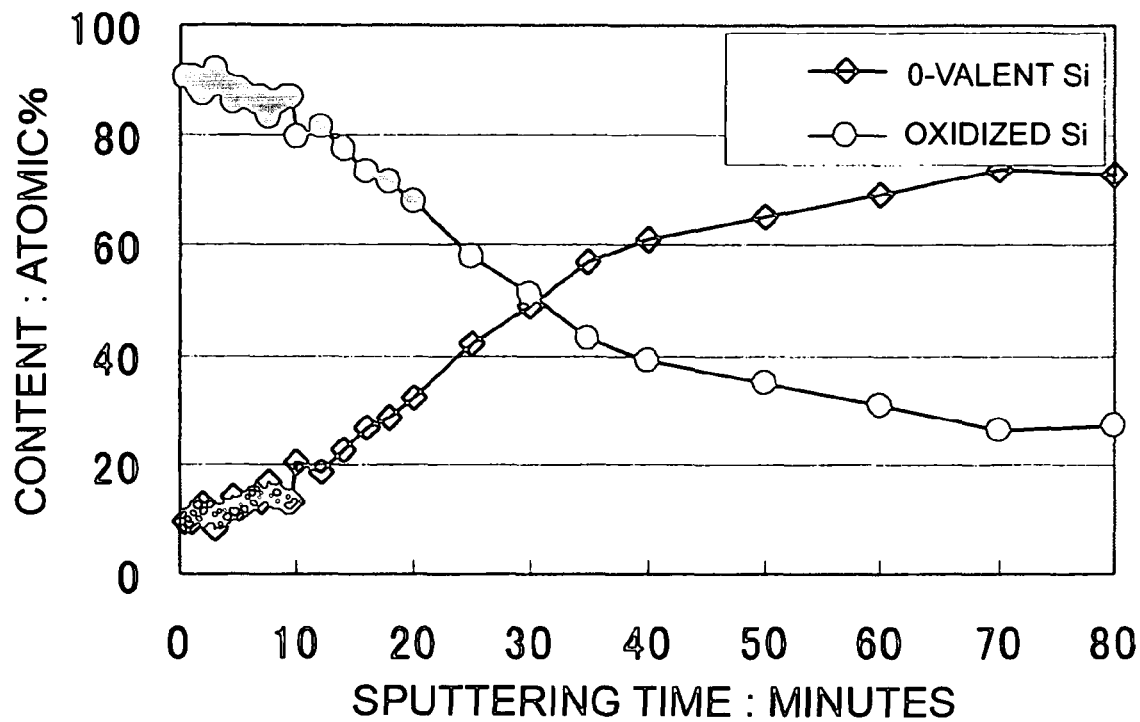
FIG. 14 is an XPS profile, showing concentrations of 0-valent silicon and silicon oxide present in a surface portion of a negative electrode of a silicon thin film in a conventional battery after discharge capacity deterioration.

The present invention is below described by way of specific examples but is not intended to be limiting thereof.

Example 1

Fabrication of Positive Electrode

Lithium cobaltate as a positive active material, ketchen black as a conductive aid and a fluororesin as a binder were mixed in the ratio by mass of 90:5:5 and then dissolved in N-methyl-2-pyrrolidone (NMP) Succinic anhydride was further added in the amount of 1.0% by weight, based on the weight of lithium cobaltate as the positive active material, to prepare a cathode mix paste.

The cathode mix paste was uniformly coated on both sides of a 20 μm thick aluminum foil by a doctor blade process, heat treated under vacuum in a heating drier at a temperature of 100-150° C. to remove NMP and then rolled by a pressure roll to a thickness of 0.16 mm to fabricate a positive electrode.

(Fabrication of Negative Electrode)

An electrolytic copper foil having a thickness of 18 μm and a surface roughness Ra of 0.188 μm was used as a current collector. A 5 μm thick silicon film was deposited on this electrolytic copper foil by an RF sputtering process under the following conditions: a sputtering gas (Ar) flow rate of 100 sccm, an ambient substrate temperature (not heated), a reaction pressure of 0.133 Pa ($1.0 \times 10^{-3}$ Torr.) and 200 W RF power. The resulting silicon thin film was analyzed by Raman spectroscopy which detected the presence of a peak around 480 $cm^{-1}$ but the absence of a peak around 520 $cm^{-1}$. This revealed an amorphous nature of the silicon thin film.

Formation of such a silicon thin film on both sides of the current collector, as described above, resulted in fabrication of a negative electrode.

(Preparation of Nonaqueous Electrolyte Solution)

1 mole/liter of $LiPF_6$ as an electrolyte salt was dissolved in a mixed solvent containing ethylene carbonate (EC) and diethyl carbonate (DEC) at a 3:7 ratio by volume to prepare an electrolyte solution.

(Construction of Secondary Battery)

Each of the positive and negative electrodes was cut into a predetermined size. A current collecting tab was attached to its current collector. A 20 μm thick separator made of a microporous polyolefin film was interposed between the positive and negative electrodes. This combination was wound and then fastened at an outermost periphery by a tape to provide a spirally-wound electrode assembly which was subsequently pressed into a flat shape. This electrode assembly was then inserted into an inner space of an outer casing made of a laminated material such as having layers of PET and aluminum. After introduction of the electrolyte solution, the outer casing was sealed such that a distal end of each tab extended from an outer edge of the outer casing, thereby constructing a lithium secondary battery.

Comparative Example 1

The procedure of Example 1 was followed, except that succinic anhydride was excluded from the cathode mix paste, to construct a lithium secondary battery.

(Evaluation of Cycle Characteristics)

The batteries obtained in Example 1 and Comparative Example 1 were evaluated for cycle characteristics. Each battery was subjected to charge-discharge cycling under the following conditions until reaching the 50th cycle to measure an initial discharge capacity and a discharge capacity after 50 cycles and calculate a discharge capacity retention (initial discharge capacity/discharge capacity after 50 cycles×100). The results are shown in Table 2.

Charging condition: constant current at 250 mA–constant voltage at 4.2 V to a final current of 12 mA Discharging condition: constant current at 250 mA to a final voltage of 2.75 V (Thickness Measurement of Active Material Layer)

Each battery was subjected to charge-discharged cycling under the above-specified conditions until reaching the 80th cycle to measure a thickness change of the active material layer after 80 cycles. Specifically, the negative electrode was removed from the battery prior to and subsequent to the above charge-discharge test and observed with a scanning electron microscope (SEM) to measure a thickness of the active material layer and calculate its thickness change.

Figure 15:
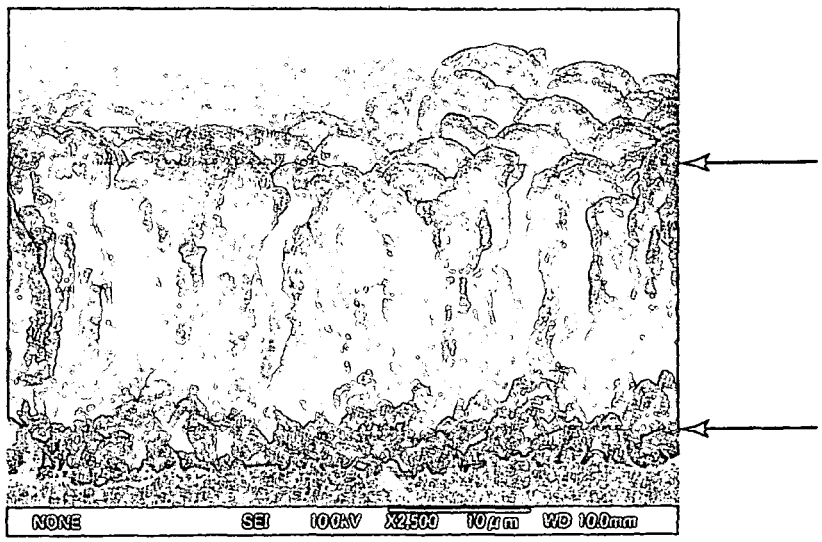
FIG. 15 is a photograph taken with a scanning electron microscope, showing a condition of a negative electrode in a battery of Example 1 in accordance with the present invention after delivery of 80 cycles.
Figure 17:
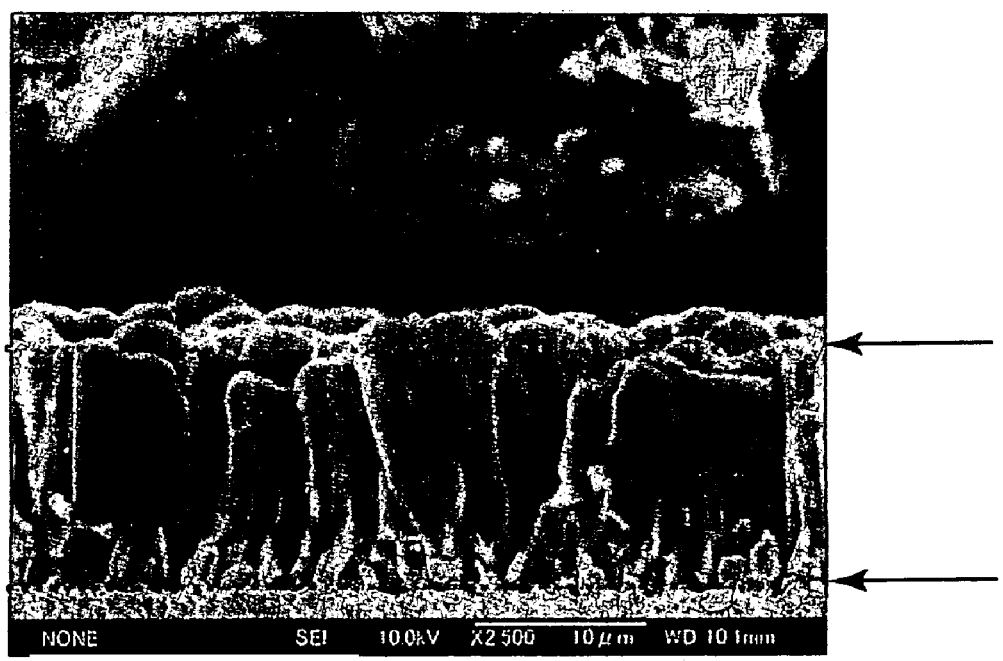
FIG. 17 is a photograph taken with a scanning electron microscope, showing a condition of a negative electrode in a battery of Comparative Example 1 while in an initial stage of a charge-discharge cycle test.
Figure 18:
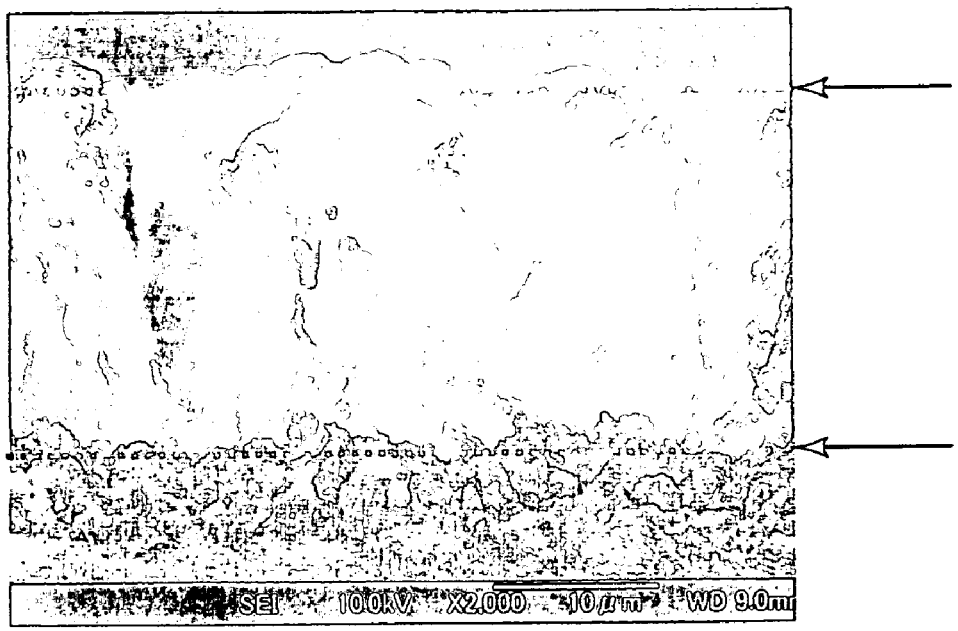
FIG. 18 is a photograph taken with a scanning electron microscope, showing a condition of a negative electrode in a battery of Comparative Example 1 after delivery of 80 cycles.

FIG. 15 is an SEM photograph, showing the negative electrode of the battery of Example 1 after 80 cycles. FIGS. 17 and 18 are SEM photographs, showing the negative electrode of Comparative Example 1 before the charge-discharge test and after 80 cycles, respectively. The thickness of the active material layer was determined using dotted lines shown in each Figure (positions shown by arrows) as standards.

The measurement results are shown in Table 2.

(Measurement of Oxygen/Silicon Ratio at Negative Electrode Surface)

After 80 cycles, the negative electrode was removed, cleaned with dimethyl carbonate and analyzed using an electron microprobe for its surface to measure an oxygen/silicon ratio at the surface. The measurement results are shown in Table 2.

TABLE 1

|  | Additive | Loading (weight %) |
| --- | --- | --- |
| Comparative Example 1 | None | — |
| Example 1 | Succinic Anhydride | 1 |

TABLE 2

|  | Oxygen/Silicon Ratio (Ratio of Numbers of Atoms) at Negative Electrode Surface | Thickness Change of Active Material Layer | Discharge Capacity Initially (mAh) | Discharge Capacity After 50 Cycles (mAh) | Discharge Capacity Retention (%) |
| --- | --- | --- | --- | --- | --- |
| Comparative Example 1 | 1.7 | 16 μm | 247 | 180 | 72.8 |
| Example 1 | 1.6 | 12 μm | 241 | 202 | 83.9 |

As can be clearly seen from the results shown in Table 2, the addition of succinic anhydride as an additive capable of retarding oxidation of silicon, in accordance with the present invention, not only results in the increased discharge capacity retention and the improved cycle characteristics but also suppresses increase in thickness of the active material layer.

Example 2

The procedure of Example 1 was followed, except that vinylene carbonate (VC) was added to the nonaqueous electrolyte solution in the amount of 2% by weight, to construct a lithium secondary battery.

Comparative Example 2

The procedure of Example 2 was followed, except that succinic anhydride was excluded from the cathode mix paste, to construct a lithium secondary battery.

TABLE 3

|  | Film Former | | Additive | |
| --- | --- | --- | --- | --- |
|  | Type of Film Former | Loading (weight %) | Type of Additive | Loading (weight %) |
| Comparative Example 1 | None | — | None | — |
| Comparative Example 2 | VC | 2 | None | — |
| Example 1 | None | — | Succinic Anhydride | 1 |
| Example 2 | VC | 2 | Succinic Anhydride | 1 |

(Measurement of Charge-Discharge Cycle Characteristics and Thickness Change of Active Material Layer of Negative Electrode)

Figure 16:
FIG. 16 is a photograph taken with a scanning electron microscope, showing a condition of a negative electrode in a battery of Example 2 in accordance with the present invention after delivery of 80 cycles.
Figure 19:
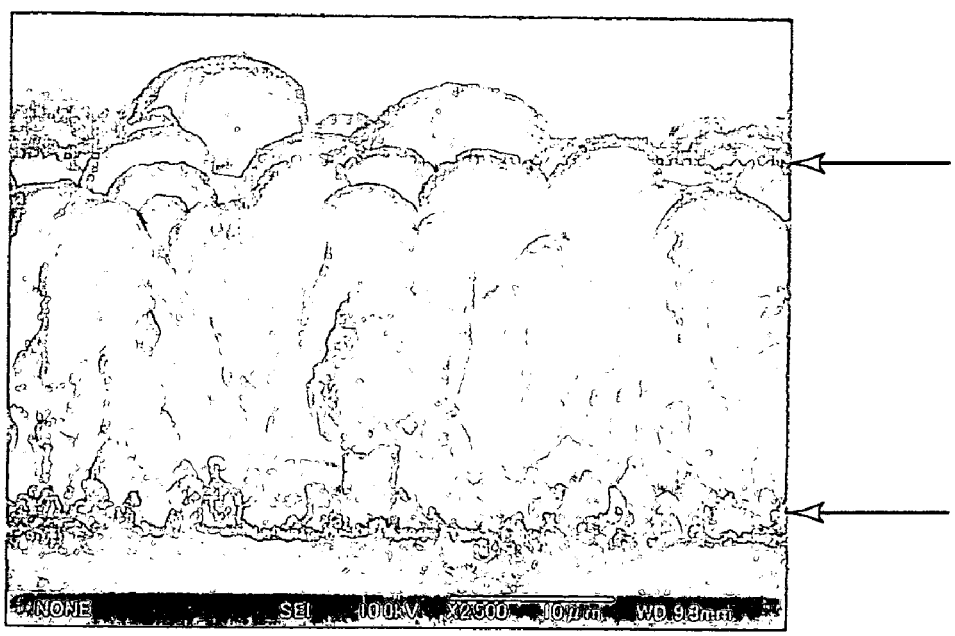
FIG. 19 is a photograph taken with a scanning electron microscope, showing a condition of a negative electrode in a battery of Comparative Example 2 after delivery of 80 cycles.

Charge-discharge cycle characteristics of each battery were evaluated in the same manner as in Example 1. Its discharge capacity retention is shown in Table 4. Also, a thickness change of an active material layer of the negative electrode was measured in the same manner as in Example 1. The results are shown in Table 4. FIG. 16 is an SEM photograph, showing the negative electrode of the battery of Example 2 after 80 cycles. FIG. 19 is an SEM photograph, showing the negative electrode of the battery of Comparative Example 2 after 80 cycles. In Table 4, the results of Example 1 and Comparative Example 1 are also shown.

TABLE 4

|  | Thickness Change of Negative Active Material Layer | Discharge Capacity Retention (%) |
| --- | --- | --- |
| Comparative Example 1 | 16 μm | 72.8 |
| Comparative Example 2 | 16 μm | 89.8 |
| Example 1 | 12 μm | 83.9 |
| Example 2 | 8 μm | 90.6 |

As can be clearly seen from the results shown in Table 4, addition of vinylene carbonate to the nonaqueous electrolyte solution, as well as incorporation of succinic anhydride in the positive electrode, results in the marked improvements in charge-discharge cycle characteristics and suppression of electrode swelling.

Example 3

In Fabrication of Positive Electrode in Example 1, succinic anhydride was not incorporated in the cathode mix slurry. Instead, the cathode mix slurry, exclusive of succinic anhydride, was coated to prepare a positive electrode. Then, succinic anhydride was dispersed over a surface of the positive electrode in the amount of 1% by weight. Dispersing was carried out by a method wherein a suspension of subdivided powder-form succinic anhydride in DEC was sprayed onto the electrode surface and subjected to a vacuum treatment to remove a solvent so that succinic anhydride was uniformly dispersed over the electrode surface. The procedure of Example 2 using the nonaqueous electrolyte solution containing VC was followed, except that the above-prepared positive electrode was used, to construct a lithium secondary battery.

Example 4

In the fabrication of negative electrode in Example 3, a thin film of a silicon-cobalt alloy, instead of the silicon thin film, was deposited. Otherwise, the procedure of Example 3 was followed to construct a lithium secondary battery. The cobalt content of the silicon-cobalt alloy thin film was 20% by weight.

TABLE 5

|  | Negative Active Material | Additive to Negative Active Material |
| --- | --- | --- |
| Example 3 | Si | None |
| Example 4 | Si | Co |

(Evaluation of Charge-Discharge Cycle Characteristics)

Charge-discharge cycle characteristics of the lithium secondary batteries obtained in Examples 3 and 4 were evaluated according to the previously outlined procedure. A discharge capacity retention for each battery was shown in Table 6.

TABLE 6

|  | Discharge Capacity Retention (%) |
| --- | --- |
| Example 3 | 81.9 |
| Example 4 | 84.6 |

As can be clearly seen from the results shown in Table 6, the use of the silicon-cobalt alloy as an active material further improves cycle characteristics. Also in the case where succinic anhydride was incorporated in a surface portion of the positive electrode, the effect of the present invention was similarly obtained.

Example 5

Fabrication of Positive Electrode

Lithium cobaltate as a positive active material, ketchen black as a conductive aid and a fluororesin as a binder were mixed in the ratio by mass of 90:5:5 and then dissolved in N-methyl-2-pyrrolidone (NMP) to prepare a cathode mix paste.

The cathode mix paste was uniformly coated on both sides of a 20 μm thick aluminum foil by a doctor blade process, heat treated under vacuum in a heating drier at a temperature of 100-150° C. to remove NMP and then rolled by a pressure roll to a thickness of 0.16 mm to fabricate a positive electrode.

(Fabrication of Negative Electrode)

An electrolytic copper foil having a thickness of 18 μm and a surface roughness Ra of 0.188 μm was used as a current collector. A 5 μm thick silicon film was deposited on this electrolytic copper foil by an RF sputtering process under the following conditions: a sputtering gas (Ar) flow rate of 100 sccm, an ambient substrate temperature (not heated), a reaction pressure of 0.133 Pa ($1.0 \times 10^{-3}$ Torr.) and 200 W RF power. The resulting silicon thin film was analyzed by Raman spectroscopy which detected the presence of a peak around 480 cm$^{-1}$ but the absence of a peak around 520 cm$^{-1}$. This revealed an amorphous nature of the silicon thin film.

Formation of such a silicon thin film on each side of the current collector, as described above, resulted in fabrication of a negative electrode. Thereafter, succinic anhydride was incorporated in a surface portion of the negative electrode. Specifically, a suspension of subdivided powder-form succinic anhydride in DEC was sprayed over a surface of the electrode. A vacuum treatment is subsequently carried out to remove DEC. As a result, the negative electrode was obtained having a surface portion in which succinic anhydride was uniformly dispersed.

(Preparation of Nonaqueous Electrolyte Solution)

1 mole/liter of $LiPF_6$ as an electrolyte salt was dissolved in a mixed solvent containing ethylene carbonate (EC) and diethyl carbonate (DEC) at a 3:7 ratio by volume. Vinylene carbonate (VC) was further added in the amount of 2% by weight to prepare an electrolyte solution.

(Construction of Secondary Battery)

Each of the positive and negative electrodes was cut into a predetermined size. A current collecting tab was attached to its current collector. A 20 μm thick separator made of a microporous polyolefin film was interposed between the positive and negative electrodes. This combination was wound and then fastened at an outermost periphery by a tape to provide a spirally-wound electrode assembly which was subsequently pressed into a flat shape. This electrode assembly was then inserted into an inner space of an outer casing made of a laminated material such as having layers of PET and aluminum. After introduction of the electrolyte solution, the outer casing was sealed such that a distal end of each tab extended from an outer edge of the outer casing, thereby constructing a lithium secondary battery.

Comparative Example 3

The procedure of Example 5 was followed, except that succinic anhydride was not incorporated in the surface portion of the negative electrode and vinylene carbonate (VC) was excluded from the electrolyte solution, to construct a lithium secondary battery.

(Evaluation of Cycle Characteristics)

The batteries obtained in Example 5 and Comparative Example 3 were evaluated for cycle characteristics. Each battery was subjected to charge-discharge cycling under the following conditions until reaching the 50th cycle to measure an initial discharge capacity and a discharge capacity after 50 cycles and calculate a discharge capacity retention (initial discharge capacity/discharge capacity after 50 cycles×100). The results are shown in Table 8.

Charging condition: constant current at 250 mA–constant voltage at 4.2 V to a final current of 12 mA Discharging condition: constant current at 250 mA to a final voltage of 2.75 V (Thickness Measurement of Active Material Layer)

Each battery was subjected to charge-discharge cycling under the above-specified conditions until reaching the 80th cycle to measure a thickness change of the active material layer after 80 cycles. Specifically, the negative electrode was removed from the battery prior to and subsequent to the above charge-discharge test and observed with a scanning electron microscope (SEM) to measure a thickness of the active material layer and calculate its thickness change.

Figure 20:
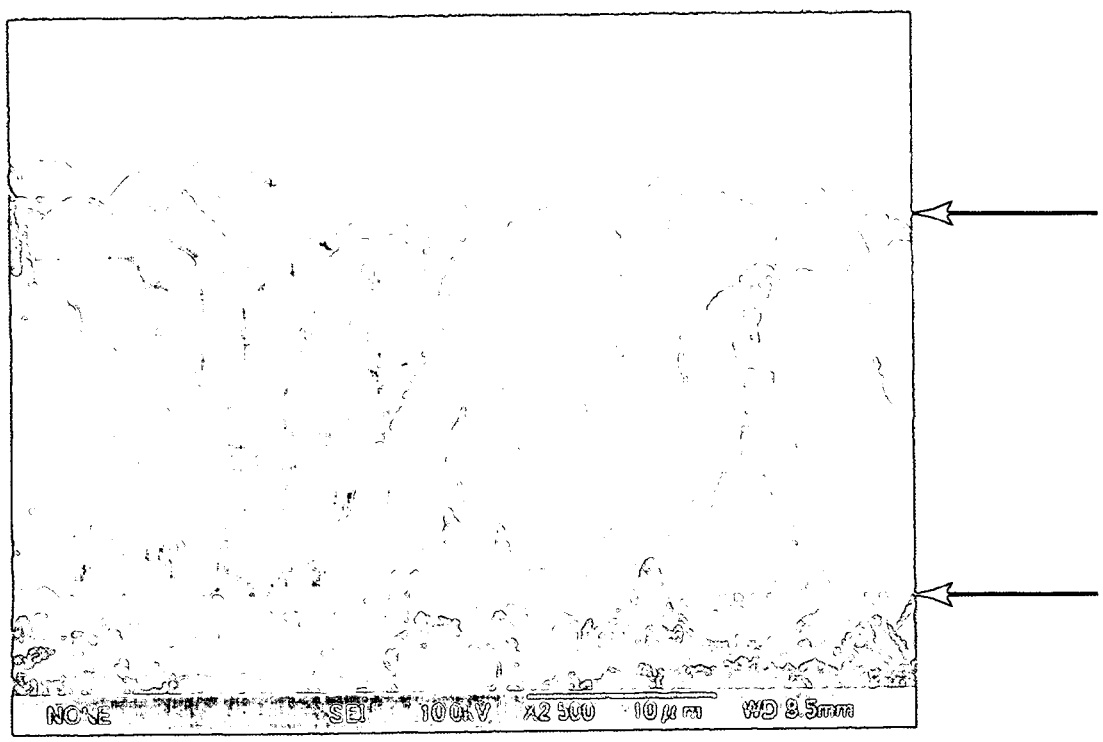
FIG. 20 is a photograph taken with a scanning electron microscope, showing a condition of a negative electrode in a battery of Example 5 in accordance with the present invention after delivery of 80 cycles.
Figure 21:
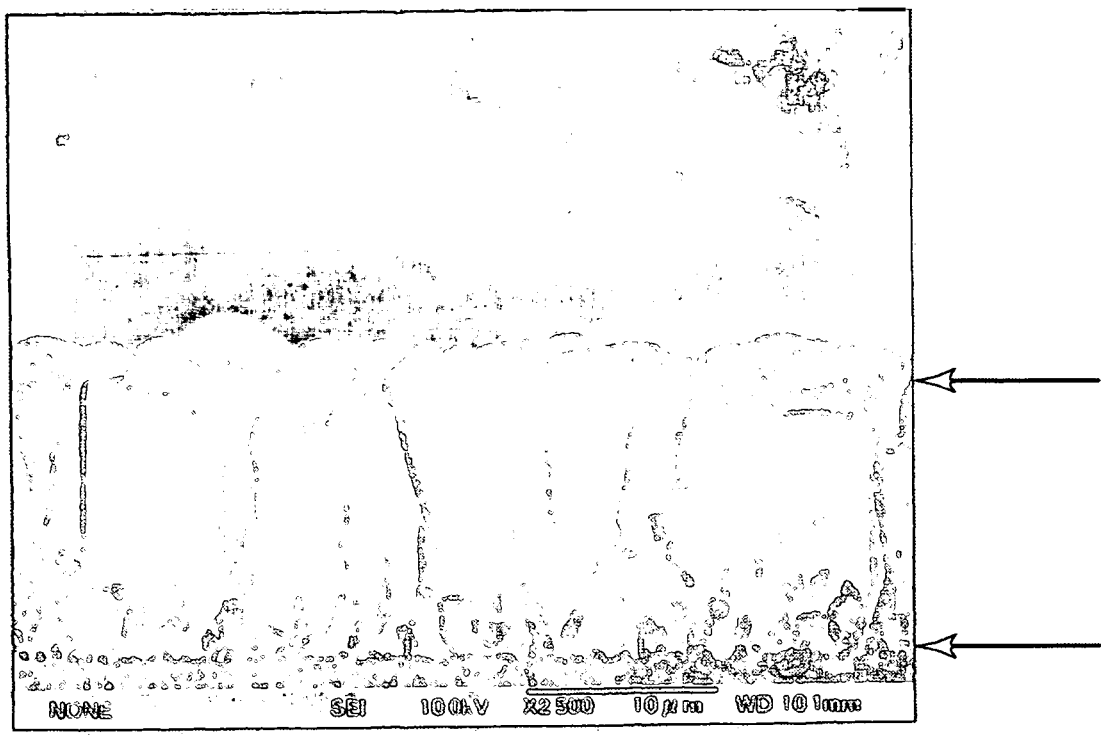
FIG. 21 is a photograph taken with a scanning electron microscope, showing a condition of a negative electrode in a battery of Comparative Example 3 while in an initial stage of a charge-discharge cycle test.
Figure 22:
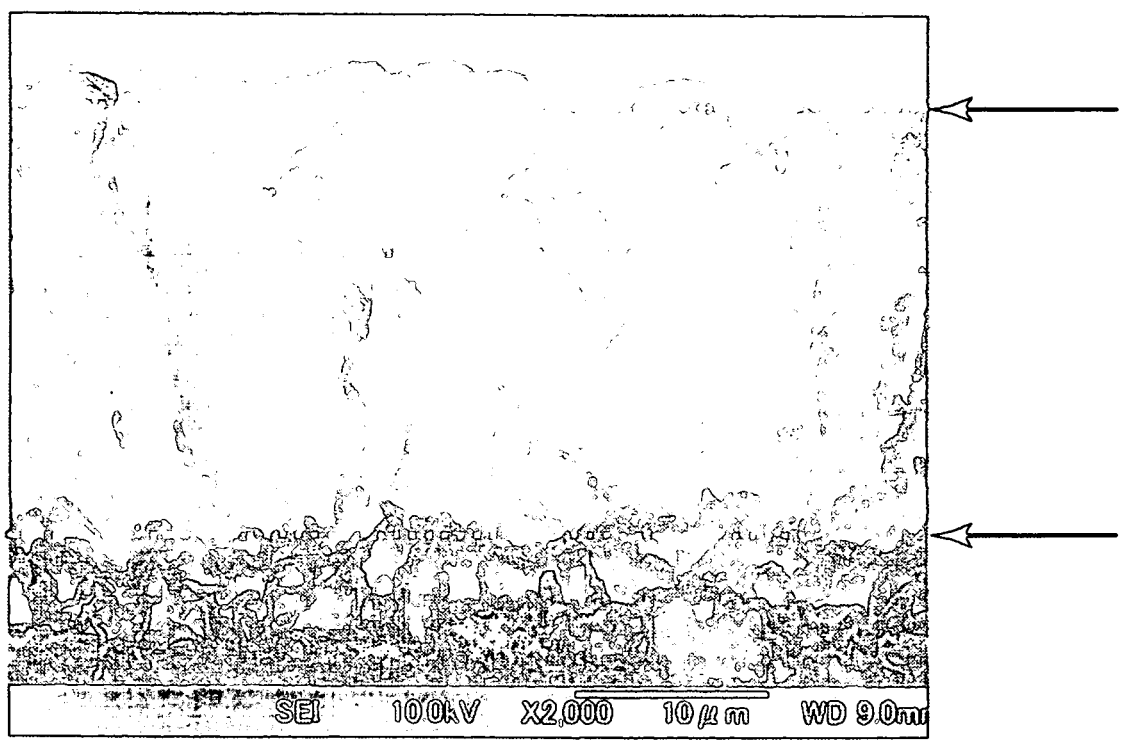
FIG. 22 is a photograph taken with a scanning electron microscope, showing a condition of a negative electrode in a battery of Comparative Example 3 after delivery of 80 cycles.

FIG. 20 is an SEM photograph, showing the negative electrode of the battery of Example 5 after 80 cycles. FIGS. 21 and 22 are SEM photographs, showing the negative electrode of Comparative Example 3 before the charge-discharge test and after 80 cycles, respectively. The thickness of the active material layer was determined using dotted lines shown in each Figure (positions shown by arrows) as standards. The measurement results are shown in Table 8.

TABLE 7

|  | Additive | | Film Former | |
|---|---|---|---|---|
|  | Type of Additive | Loading (weight %) | Type of Film Former | Loading (weight %) |
| Comparative Example 3 | None | — | None | — |
| Example 5 | Succinic Anhydride | 1 | VC | 2 |

TABLE 8

|  | Thickness Change of Active Material Layer | Discharge Capacity | | Discharge Capacity Retention (%) |
|---|---|---|---|---|
|  |  | Initially (mAh) | After 50 Cycles (mAh) |  |
| Comparative Example 3 | 16 μm | 247 | 180 | 72.8 |
| Example 5 | 12 μm | 247 | 226 | 91.4 |

As can be clearly seen from the results shown in Table 8, the incorporation of succinic anhydride as an additive capable of retarding oxidation of silicon in the surface portion of the negative electrode and the inclusion of VC in the electrolyte solution, in accordance with the present invention, not only results in the increased discharge capacity retention and the improved cycle characteristics but also suppresses increase in thickness of the active material layer.

Comparative Example 4

The procedure of Comparative Example 3 was followed, except that vinylene carbonate (VC) was added to the non-aqueous electrolyte solution in the amount of 2% by weight, to construct a lithium secondary battery.

Comparative Example 5

The procedure of Comparative Example 3 was followed, except that succinic anhydride was incorporated in a surface portion of the negative electrode, to construct a lithium secondary battery.

TABLE 9

|  | Additive | | Film Former | |
|---|---|---|---|---|
|  | Type of Additive | Loading (weight %) | Type of Film Former | Loading (weight %) |
| Comparative Example 3 | None | — | None | — |
| Comparative Example 4 | None | — | VC | 2 |
| Comparative Example 5 | Succinic Anhydride | 1 | None | — |
| Example 5 | Succinic Anhydride | 1 | VC | 2 |

(Measurement of Charge-Discharge Cycle Characteristics and Thickness Change of Active Material of Negative Electrode)

Figure 23:
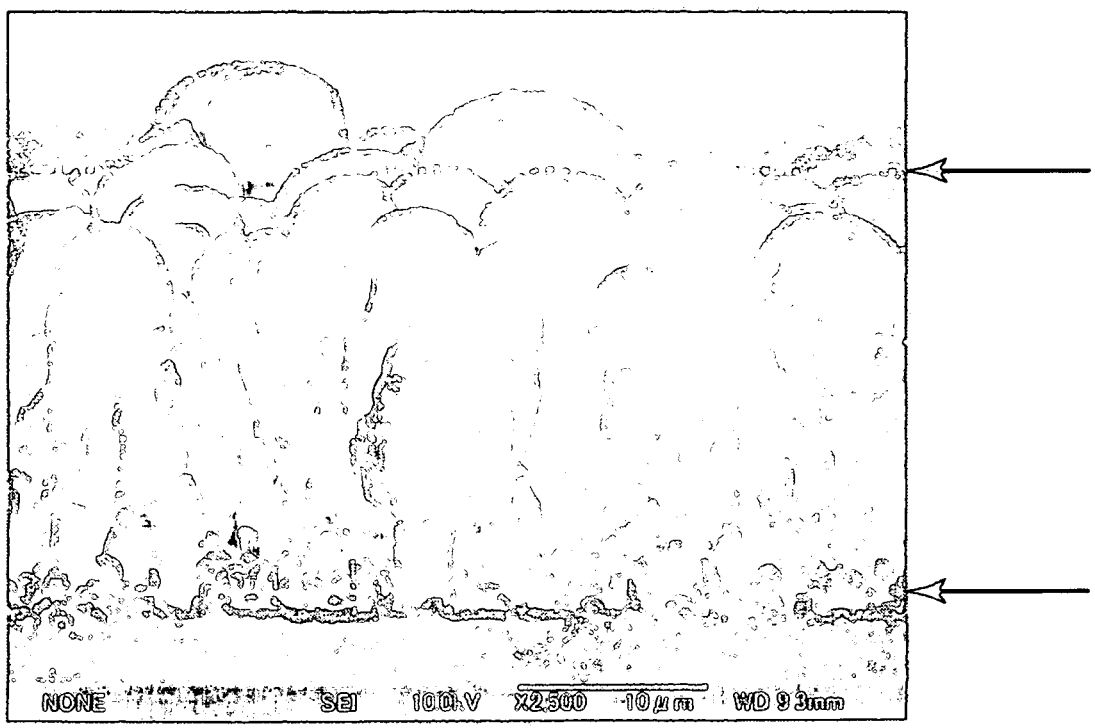
FIG. 23 is a photograph taken with a scanning electron microscope, showing a condition of a negative electrode in a battery of Comparative Example 4 after delivery of 80 cycles.
Figure 24:
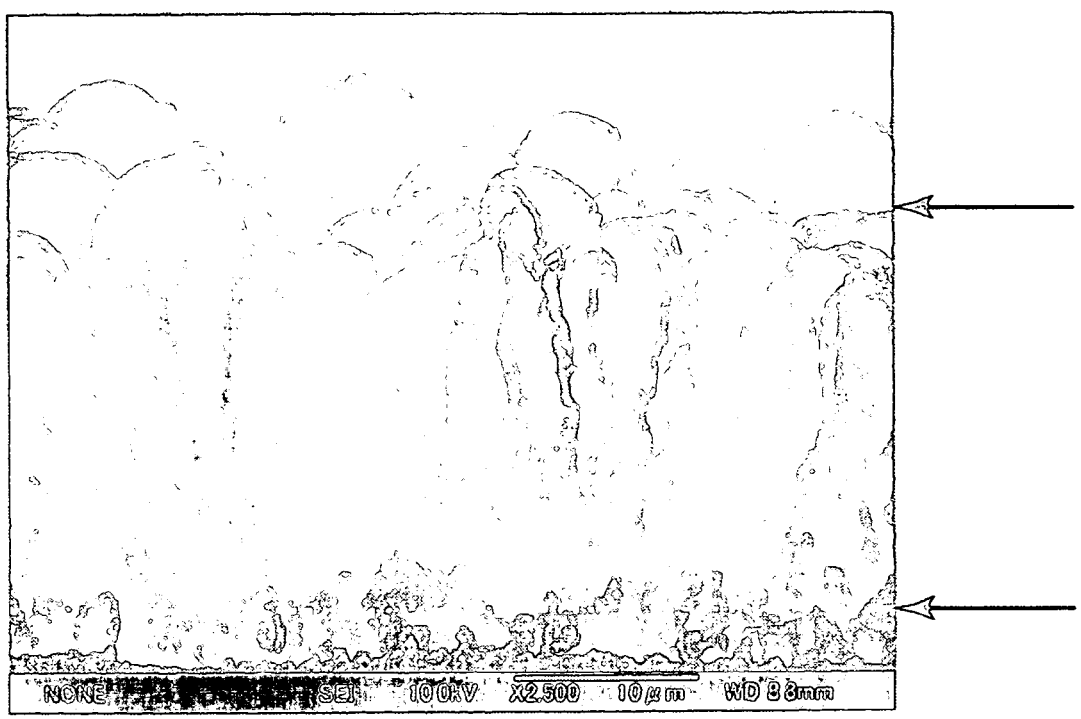
FIG. 24 is a photograph taken with a scanning electron microscope, showing a condition of a negative electrode in a battery of Comparative Example 5 after delivery of 80 cycles.

Charge-discharge cycle characteristics of each battery were evaluated in the same manner as in Example 5. Its discharge capacity retention is shown in Table 10. Also, a thickness change of an active material layer of the negative electrode was measured in the same manner as in Example 5 and shown in Table 10. FIG. 23 is an SEM photograph, showing the negative electrode of the battery of Comparative Example 4 after 80 cycles. FIG. 24 is an SEM photograph, showing the negative electrode of the battery of Comparative Example 5 after 80 cycles. In Table 10, the results of Example 5 and Comparative Example 3 are also shown.

TABLE 10

|  | Thickness Change of Negative Active Material Layer | Discharge Capacity Retention (%) |
|---|---|---|
| Comparative Example 3 | 16 μm | 72.8 |
| Comparative Example 4 | 16 μm | 89.8 |
| Comparative Example 5 | 16 μm | 78.6 |
| Example 5 | 12 μm | 91.4 |

As can be clearly seen from the results shown in Table 10, the incorporation of vinylene carbonate in the nonaqueous electrolyte solution, as well as the inclusion of succinic anhydride in the surface portion of the negative electrode, results in the marked improvements in charge-discharge cycle characteristics and suppression of electrode swelling.

Example 6

In the fabrication of negative electrode in Example 5, a thin film of a silicon-cobalt alloy, instead of the silicon thin film, was deposited. Otherwise, the procedure of Example 5 was followed to construct a lithium secondary battery. The cobalt content of the silicon-cobalt alloy thin film was 20% by weight.

TABLE 11

|  | Negative Active Material | Additive to Negative Active Material |
| --- | --- | --- |
| Example 5 | Si | None |
| Example 6 | Si | Co |

(Evaluation of Charge-Discharge Cycle Characteristics)

Charge-discharge cycle characteristics of the lithium secondary batteries obtained in Examples 5 and 6 were evaluated according to the previously outlined procedure. A discharge capacity retention for each battery was shown in Table 12.

TABLE 12

|  | Discharge Capacity Retention (%) |
| --- | --- |
| Example 5 | 91.4 |
| Example 6 | 92.7 |

As can be clearly seen from the results shown in Table 12, the use of the silicon-cobalt alloy as an active material further improves cycle characteristics.

Example 7

(Fabrication of Positive Electrode)

Lithium cobaltate as a positive active material, ketchen black as a conductive aid and a fluororesin as a binder were mixed in the ratio by mass of 90:5:5 and then dissolved in N-methyl-2-pyrrolidone (NMP) to prepare a cathode mix paste.

The cathode mix paste was uniformly coated on both sides of a 20 μm thick aluminum foil by a doctor blade process, heat treated under vacuum in a heating drier at a temperature of 100-150° C. to remove NMP and then rolled by a pressure roll to a thickness of 0.16 mm to fabricate a positive electrode.

(Fabrication of Negative Electrode)

An electrolytic copper foil having a thickness of 18 μm and a surface roughness Ra of 0.188 μm was used as a current collector. A 5 μm thick silicon film was deposited on this electrolytic copper foil by an RF sputtering process under the following conditions: a sputtering gas (Ar) flow rate of 100 sccm, an ambient substrate temperature (not heated), a reaction pressure of 0.133 Pa ($1.0 \times 10^{-3}$ Torr.) and 200 W RF power. The resulting silicon thin film was analyzed by Raman spectroscopy which detected the presence of a peak around 480 $cm^{-1}$ but the absence of a peak around 520 $cm^{-1}$. This revealed an amorphous nature of the silicon thin film.

Formation of such a silicon thin film on each side of the current collector, as described above, resulted in fabrication of a negative electrode.

(Fabrication of Separator)

Silica powder having surfaces to which ester was adsorbed and polyethylene powder were mixed and melt extruded into a 200 μm thick sheet. The resulting sheet was immersed in a 20 wt. % aqueous solution of sodium hydroxide and an organic solvent to remove the silica powder and ester. The sheet was further cleaned with water, dried and then drawn both in the MD (machine direction) and TD (transverse direction) to obtain a separator comprised of a 20 μm thick, microporous polyethylene film having internal micropores.

Succinic anhydride was dissolved in diethyl carbonate to prepare a solution containing 1 mole/liter of succinic anhydride. The separator was immersed in this solution sufficiently and then vacuum dried to remove diethyl carbonate, so that succinic anhydride was uniformly dispersed throughout micropores of the separator. The succinic anhydride content of the separator was determined by measuring the weight of the separator prior to and subsequent to inclusion of the succinic anhydride. The succinic anhydride content was $1 \times 10^{-5}$ $g/cm^2$.

(Preparation of Nonaqueous Electrolyte Solution)

1 mole/liter of $LiPF_6$ as an electrolyte salt was dissolved in a mixed solvent containing ethylene carbonate (EC) and diethyl carbonate (DEC) at a 3:7 ratio by volume to prepare an electrolyte solution.

(Construction of Secondary Battery)

Each of the positive and negative electrodes was cut into a predetermined size. A current collecting tab was attached to its current collector. The separator as fabricated above was interposed between the positive and negative electrodes. This combination was wound and then fastened at an outermost periphery by a tape to provide a spirally-wound electrode assembly which was subsequently pressed into a flat shape. This electrode assembly was then inserted into an inner space of an outer casing made of a laminated material such as having layers of PET and aluminum. After introduction of the electrolyte solution, the outer casing was sealed such that a distal end of each tab extended from an outer edge of the outer casing, thereby constructing a lithium secondary battery.

Comparative Example 6

The procedure of Example 7 was followed, except that succinic anhydride as an additive was not incorporated in the separator, to construct a lithium secondary battery.

(Evaluation of Cycle Characteristics)

The batteries obtained in Example 7 and Comparative Example 6 were evaluated for cycle characteristics. Each battery was subjected to charge-discharge cycling under the following conditions until reaching the 50th cycle to measure an initial discharge capacity and a discharge capacity after 50 cycles and calculate a discharge capacity retention (initial discharge capacity/discharge capacity after 50 cycles×100). The results are shown in Table 14.

Charging condition: constant current at 250 mA–constant voltage at 4.2 V to a final current of 12 mA Discharging condition: constant current at 250 mA to a final voltage of 2.75 V (Thickness Measurement of Active Material Layer)

Each battery was subjected to charge-discharged cycling under the above-specified conditions until reaching the 80th cycle to measure a thickness change of the active material layer after 80 cycles. Specifically, the negative electrode was removed from the battery prior to and subsequent to the above charge-discharge test and observed with a scanning electron microscope (SEM) to measure a thickness of the active material layer and calculate its thickness change.

Figure 25:
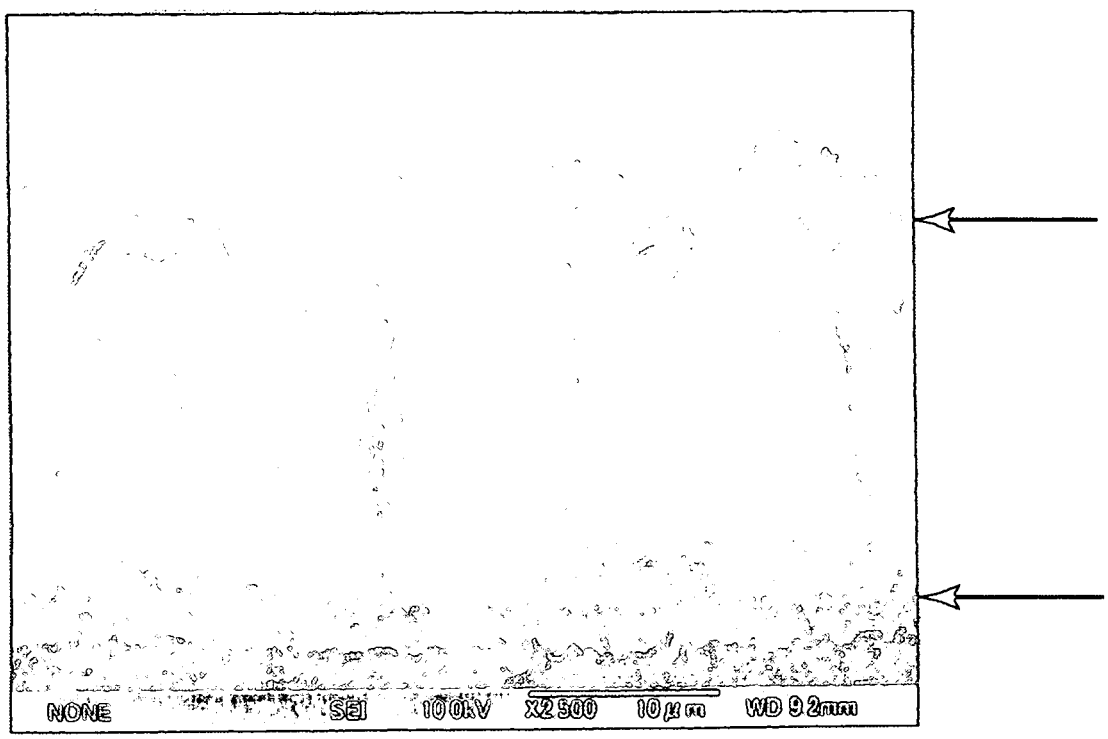
FIG. 25 is a photograph taken with a scanning electron microscope, showing a condition of a negative electrode in a battery of Example 7 in accordance with the present invention after delivery of 80 cycles.
Figure 27:
FIG. 27 is a photograph taken with a scanning electron microscope, showing a condition of a negative electrode in a battery of Comparative Example 6 while in an initial stage of a charge-discharge cycle test.
Figure 28:
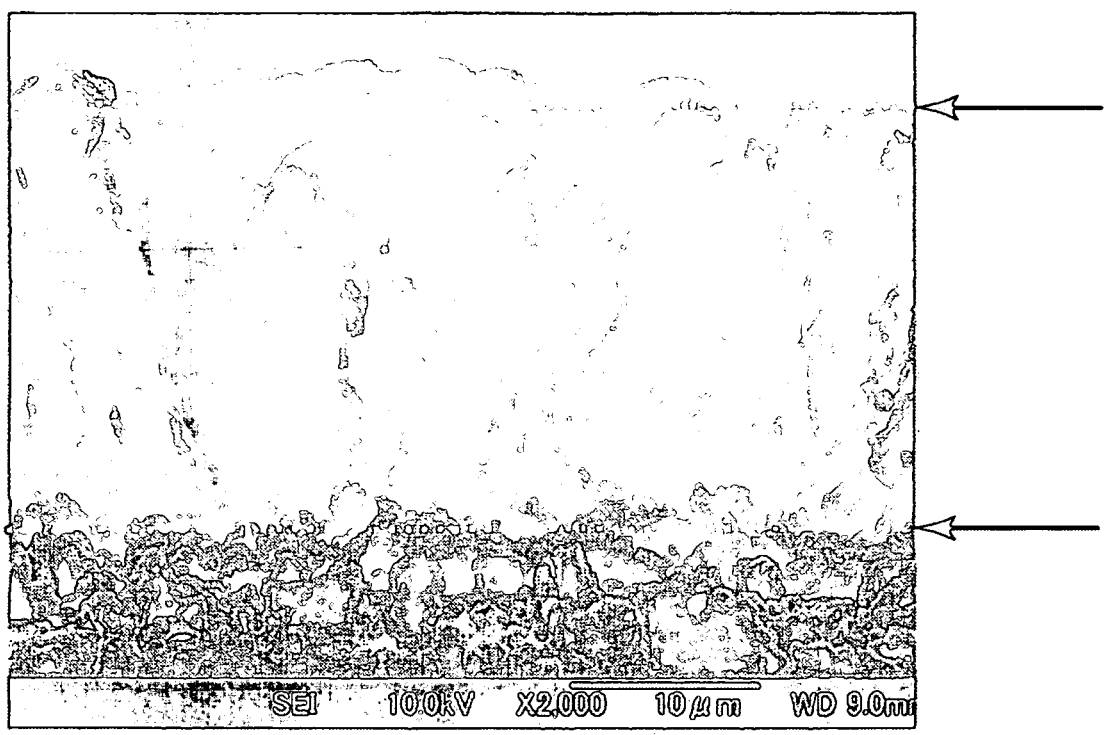
FIG. 28 is a photograph taken with a scanning electron microscope, showing a condition of a negative electrode in a battery of Comparative Example 6 after delivery of 80 cycles.

FIG. 25 is an SEM photograph, showing the negative electrode of the battery of Example 7 after 80 cycles. FIGS. 27 and 28 are SEM photographs, showing the negative electrode of Comparative Example 6 before the charge-discharge test and after 80 cycles, respectively. The thickness of the active material layer was determined using dotted lines shown in each Figure (positions shown by arrows) as standards. The measurement results are shown in Table 14.

(Measurement of Oxygen/Silicon Ratio at Negative Electrode Surface)

After 80 cycles, the negative electrode was removed, cleaned with dimethyl carbonate and analyzed using an electron microprobe for elements to measure an oxygen/silicon ratio at the surface of the negative electrode. The measurement results are shown in Table 14.

TABLE 13

| | Additive | Content ($\times 10^{-5}$ g/cm$^2$) |
|---|---|---|
| Comparative Example 6 | None | — |
| Example 7 | Succinic Anhydride | 1 |

TABLE 14

| | Oxygen/Silicon Ratio (Ratio of Numbers of Atoms) at Negative Electrode Surface | Thickness Change of Active Material Layer | Discharge Capacity | | Discharge Capacity Retention (%) |
|---|---|---|---|---|---|
| | | | Initially (mAh) | After 50 Cycles (mAh) | |
| Comparative Example 6 | 1.7 | 16 μm | 247 | 180 | 72.8 |
| Example 7 | 1.6 | 12 μm | 239 | 198 | 82.8 |

As can be clearly seen from the results shown in Table 14, the inclusion of succinic anhydride as an additive capable of retarding oxidation of silicon, in accordance with the present invention, not only results in the increased discharge capacity retention and the improved cycle characteristics, but also suppresses increase in thickness of the active material layer.

Example 8

The procedure of Example 7 was followed, except that vinylene carbonate (VC) was added to the nonaqueous electrolyte solution in the amount of 2% by weight, to construct a lithium secondary battery.

Comparative Example 7

The procedure of Example 8 was followed, except that succinic anhydride was not incorporated in the separator, to construct a lithium secondary battery.

TABLE 15

| | Film Former | | Additive | |
|---|---|---|---|---|
| | Type of Film Former | Loading (weight %) | Type of Additive | Content ($\times 10^{-5}$ g/cm$^2$) |
| Comparative Example 6 | None | — | None | — |
| Comparative Example 7 | VC | 2 | None | — |
| Example 7 | None | — | Succinic Anhydride | 1 |
| Example 8 | VC | 2 | Succinic Anhydride | 1 |

(Measurement of Charge-Discharge Cycle Characteristics and Thickness Change of Active Material Layer of Negative Electrode)

Figure 26:
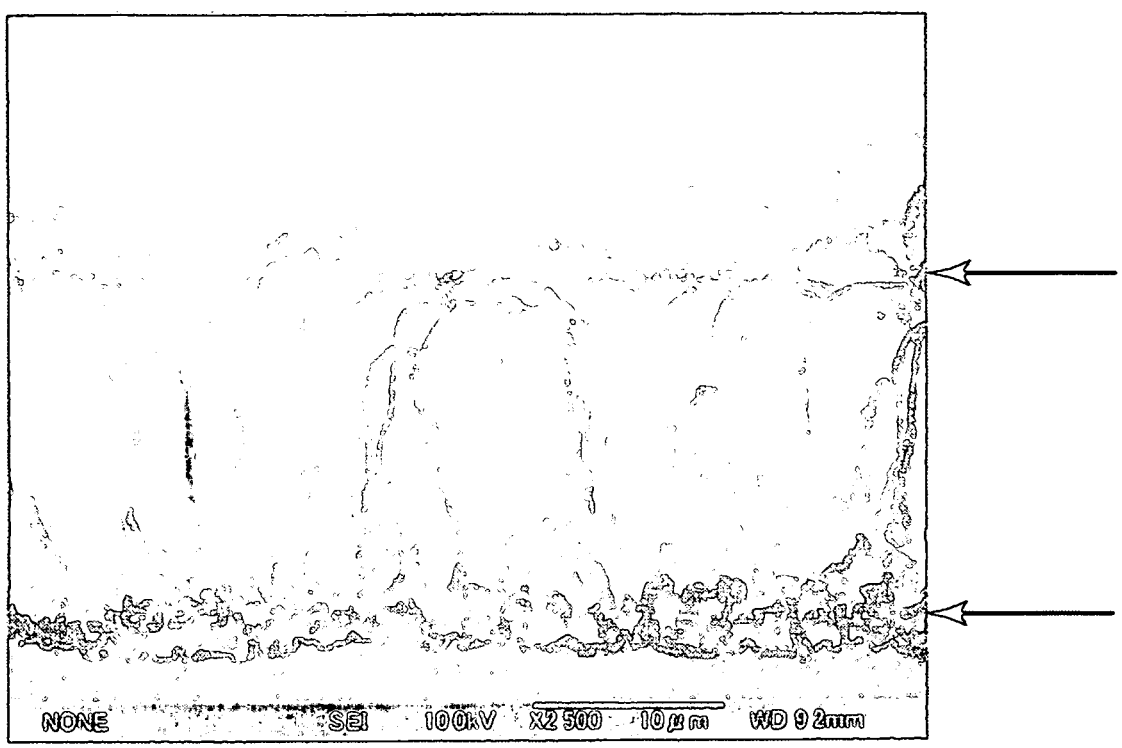
FIG. 26 is a photograph taken with a scanning electron microscope, showing a condition of a negative electrode in a battery of Example 8 in accordance with the present invention after delivery of 80 cycles.
Figure 29:
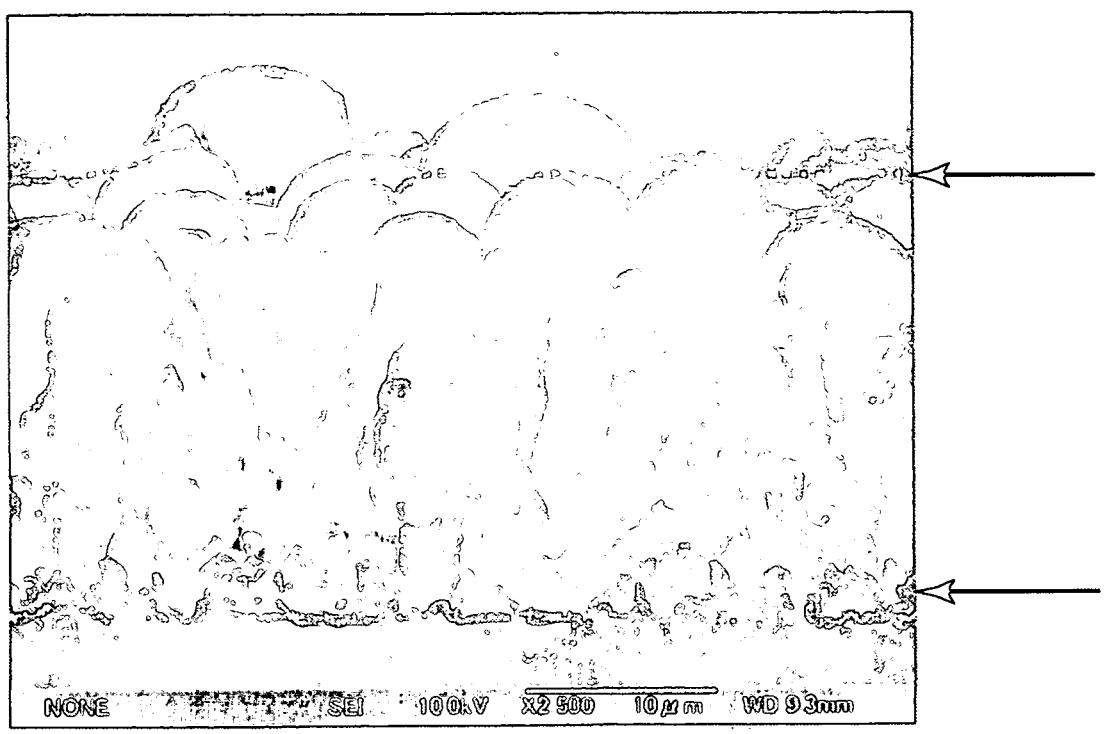
FIG. 29 is a photograph taken with a scanning electron microscope, showing a condition of a negative electrode in a battery of Comparative Example 7 after delivery of 80 cycles.

Charge-discharge cycle characteristics of each battery were evaluated in the same manner as in Example 7. Its discharge capacity retention is shown in Table 16. Also, a thickness change of an active material layer of the negative electrode was measured in the same manner as in Example 7 and shown in Table 16. FIG. 26 is an SEM photograph, showing the negative electrode of the battery of Example 8 after 80 cycles. FIG. 29 is an SEM photograph, showing the negative electrode of the battery of Comparative Example 7 after 80 cycles. In Table 16, the results of Example 7 and Comparative Example 6 are also shown.

TABLE 16

| | Thickness Change of Negative Active Material Layer | Discharge Capacity Retention (%) |
|---|---|---|
| Comparative Example 6 | 16 μm | 72.8 |
| Comparative Example 7 | 16 μm | 89.8 |
| Example 7 | 12 μm | 82.8 |
| Example 8 | 8 μm | 90.6 |

As can be clearly seen from the results shown in Table 16, the incorporation of vinylene carbonate in the nonaqueous electrolyte solution, as well as the inclusion of succinic anhydride in the separator, results in the marked improvements in charge-discharge cycle characteristics and suppression of electrode swelling.

Example 9

As contrary to the procedure of Example 7, $1 \times 10^{-5}$ g/cm$^2$ of succinic anhydride was incorporated in a surface portion of the separator by dispersing succinic anhydride over a surface of the separator. Dispersing was carried out by a method wherein a suspension of subdivided powder-form succinic anhydride in DEC was sprayed onto the separator surface and then subjected to a vacuum treatment to remove DEC so that the additive was uniformly dispersed over the separator surface. This resulted in the uniform incorporation of the additive in the surface portion of the separator. The procedure of Example 8 using the nonaqueous electrolyte solution containing VC was then followed, except that the above-fabricated separator was used, to construct a lithium secondary battery.

Example 10

In the fabrication of negative electrode in Example 9, a thin film of a silicon-cobalt alloy, instead of the silicon thin film, was deposited. Otherwise, the procedure of Example 9 was followed to construct a lithium secondary battery. The cobalt content of the silicon-cobalt alloy thin film was 20% by weight.

TABLE 17

|  | Negative Active Material | Additive to Negative Active Material |
|---|---|---|
| Example 9 | Si | None |
| Example 10 | Si | Co |

(Evaluation of Charge-Discharge Cycle Characteristics)

Charge-discharge cycle characteristics of the lithium secondary batteries obtained in Examples 9 and 10 were evaluated according to the previously outlined procedure. A discharge capacity retention for each battery was shown in Table 18.

TABLE 18

|  | Discharge Capacity Retention (%) |
|---|---|
| Example 9 | 81.2 |
| Example 10 | 84.6 |

As can be clearly seen from the results shown in Table 18, the use of the silicon-cobalt alloy as an active material further improves cycle characteristics. Also in the case where succinic anhydride was incorporated in a surface portion of the separator, the effect of the present invention was similarly obtained.

What is claimed is:

1. A nonaqueous electrolyte secondary battery which includes a negative electrode containing silicon as a negative active material, a positive electrode containing a positive active material, a nonaqueous electrolyte and a separator; said battery being characterized in that, as an additive which retards oxidation of said silicon during battery operation, succinic anhydride is contained either in an interior or surface portion of said positive electrode, or in an interior or surface portion of said negative electrode, or in an interior or surface portion of said separator, and said nonaqueous electrolyte contains a film former which forms a film on a surface of said negative electrode, said film former comprising vinylene carbonate.

2. The nonaqueous electrolyte secondary battery as recited in claim 1, characterized in that said succinic anhydride is contained in said interior or surface portion of the positive electrode.

3. The nonaqueous electrolyte secondary battery as recited in claim 1, characterized in that said succinic anhydride is contained in said interior or surface portion of the negative electrode and a film former which forms a film on a surface of the negative electrode is contained in said nonaqueous electrolyte.

4. The nonaqueous electrolyte secondary battery as recited in claim 1, characterized in that said succinic anhydride is contained in said interior or surface portion of the separator.

5. The nonaqueous electrolyte secondary battery as recited in claim 1, characterized in that said negative electrode is an electrode fabricated by depositing a thin film of silicon or silicon ally on a current collector.

6. The nonaqueous electrolyte secondary battery as recited in claim 5, characterized in that said thin film has such a columnar structure that it is divided into columns by gaps formed therein and extending in its thickness direction.

7. The nonaqueous electrolyte secondary battery as recited in claim 1, characterized in that said negative active material comprises an alloy of silicon and other metal.

8. The nonaqueous electrolyte secondary battery as recited in claim 1, characterized in that said succinic anhydride in the nonaqueous electrolyte exists in the solid form.

9. The nonaqueous electrolyte secondary battery as recited in claim 1, characterized in that said succinic anhydride has a mean particle size within a particle size distribution of said positive or negative active material.

10. The nonaqueous electrolyte secondary battery as recited in claim 1, characterized in that said succinic anhydride is held within a support material.

11. The nonaqueous electrolyte secondary battery as recited in claim 10, characterized in that said support material comprises solid fine particles (fillers).

12. The nonaqueous electrolyte secondary battery as recited in claim 10, characterized in that said support material is electronically conductive.

* * * * *